US011470628B2

(12) United States Patent
Li et al.

(10) Patent No.: US 11,470,628 B2
(45) Date of Patent: Oct. 11, 2022

(54) METHOD AND SYSTEM FOR SCHEDULED UPLINK TRANSMISSION IN A WIRELESS NETWORK

(71) Applicant: Telefonaktiebolaget LM Ericsson (publ), Stockholm (SE)

(72) Inventors: Gen Li, Beijing (CN); Jung-Fu Cheng, Fremont, CA (US)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 145 days.

(21) Appl. No.: 16/968,116

(22) PCT Filed: Feb. 15, 2019

(86) PCT No.: PCT/CN2019/075213
§ 371 (c)(1),
(2) Date: Aug. 6, 2020

(87) PCT Pub. No.: WO2019/158123
PCT Pub. Date: Aug. 22, 2019

(65) Prior Publication Data
US 2021/0368526 A1    Nov. 25, 2021

(30) Foreign Application Priority Data
Feb. 16, 2018   (WO) ................ PCT/CN2018/076920

(51) Int. Cl.
*H04W 72/12*    (2009.01)
*H04L 1/18*    (2006.01)
(Continued)

(52) U.S. Cl.
CPC ....... *H04W 72/1268* (2013.01); *H04L 1/1896* (2013.01); *H04W 24/08* (2013.01); *H04W 72/1226* (2013.01); *H04W 72/14* (2013.01)

(58) Field of Classification Search
CPC ..................... H04W 72/1268; H04W 72/1226
See application file for complete search history.

(56) References Cited

U.S. PATENT DOCUMENTS 9,014,033 B2 * 4/2015 Gage ..................... H04L 5/0037
370/252
10,455,611 B2 * 10/2019 Lee ........................ H04L 1/1896
(Continued)

FOREIGN PATENT DOCUMENTS

CN   102017765 A   4/2011
CN   102271413 A   12/2011
(Continued)

OTHER PUBLICATIONS

International Search Report and Written Opinion, PCT App. No. PCT/CN2019/075213, dated Apr. 16, 2019, 10 pages.
(Continued)

*Primary Examiner* — Parth Patel
(74) *Attorney, Agent, or Firm* — Christopher & Weisberg. P.A.

(57) ABSTRACT

Method and apparatus of a terminal device and a base station for scheduled uplink transmission are provided in this disclosure. In a terminal device, an uplink grant from a base station is detected providing permission of data transmission from the terminal device. A coordination indicator identifying a resource coordination zone is transmitted to the base station along with the data. Then, controlling messages are sent from the terminal device for a further uplink grant to be issued from the base station, based on monitoring the resource coordination zone. Problem arising from channel interference can be resolved through the provided methods.

17 Claims, 12 Drawing Sheets

(51) Int. Cl.
*H04W 24/08* (2009.01)
*H04W 72/14* (2009.01)

(56) References Cited

U.S. PATENT DOCUMENTS

| | | | |
|---|---|---|---|
| 11,122,486 B2* | 9/2021 | Kalhan | H04W 36/0072 |
| 11,153,857 B2* | 10/2021 | Park | H04L 5/0051 |
| 2007/0105561 A1* | 5/2007 | Doetsch | H04W 72/082 |
| | | | 455/450 |
| 2008/0232307 A1* | 9/2008 | Pi | H04W 72/14 |
| | | | 370/328 |
| 2009/0227263 A1* | 9/2009 | Agrawal | H04W 52/343 |
| | | | 455/63.1 |
| 2010/0029212 A1* | 2/2010 | Malladi | H04W 52/08 |
| | | | 455/63.1 |
| 2010/0142467 A1 | 6/2010 | Tiirola et al. | |
| 2011/0237243 A1* | 9/2011 | Guvenc | H04L 5/0032 |
| | | | 455/423 |
| 2012/0020312 A1 | 1/2012 | Lv et al. | |
| 2012/0207079 A1* | 8/2012 | Wang | H04W 28/0284 |
| | | | 370/315 |
| 2014/0010138 A1 | 1/2014 | Flammer, III | |
| 2014/0112158 A1* | 4/2014 | Tavildar | H04B 7/15542 |
| | | | 370/246 |
| 2015/0018001 A1* | 1/2015 | Kim | H04W 72/082 |
| | | | 455/452.2 |
| 2015/0078220 A1* | 3/2015 | Hu | H04W 24/08 |
| | | | 370/280 |
| 2015/0195793 A1* | 7/2015 | Shin | H04W 52/262 |
| | | | 455/522 |
| 2015/0230105 A1 | 8/2015 | Negus et al. | |
| 2016/0128096 A1* | 5/2016 | Damnjanovic | H04L 5/0055 |
| | | | 370/329 |
| 2016/0234857 A1* | 8/2016 | Chen | H04L 5/0044 |
| 2017/0048886 A1* | 2/2017 | Sun | H04L 5/0053 |
| 2017/0094673 A1* | 3/2017 | Jitsukawa | H04W 72/082 |
| 2017/0230998 A1* | 8/2017 | Meng | H04L 1/1896 |
| 2018/0035459 A1* | 2/2018 | Islam | H04L 1/1887 |
| 2018/0054270 A1* | 2/2018 | Xiong | H04B 7/0417 |
| 2018/0091283 A1* | 3/2018 | Wang | H04L 5/1461 |
| 2018/0123625 A1* | 5/2018 | Lee | H04W 28/02 |
| 2018/0131473 A1* | 5/2018 | Moon | H04W 72/0413 |
| 2018/0139772 A1* | 5/2018 | Ozturk | H04W 72/1278 |
| 2018/0167848 A1* | 6/2018 | Lei | H04W 74/0816 |
| 2018/0184315 A1* | 6/2018 | Ji | H04L 5/0073 |
| 2018/0324856 A1* | 11/2018 | Zhang | H04W 72/1289 |
| 2018/0368117 A1* | 12/2018 | Ying | H04L 1/16 |
| 2019/0254059 A1* | 8/2019 | Gulati | H04W 72/1231 |
| 2019/0372725 A1* | 12/2019 | Hongo | H04B 7/0848 |
| 2020/0374889 A1* | 11/2020 | Kalhan | H04W 24/10 |
| 2021/0368500 A1* | 11/2021 | Centonza | H04W 76/15 |
| 2021/0368526 A1* | 11/2021 | Li | H04W 72/1231 |
| 2022/0038985 A1* | 2/2022 | Deenoo | H04W 36/0069 |

FOREIGN PATENT DOCUMENTS

| | | |
|---|---|---|
| CN | 103906198 A | 7/2014 |
| CN | 106797569 A | 5/2017 |
| WO | 2016/197315 A1 | 12/2016 |
| WO | 2017096246 A2 | 11/2017 |
| WO | 2019089236 A1 | 5/2019 |

OTHER PUBLICATIONS

International Search Report and Written Opinion, PCT App. No. PCT/CN2019/075218, dated May 8, 2019, 9 pages.
EPO Communication and Search Report dated Nov. 5, 2021 for Patent Application No. 19753916.6 consisting of 13-pages.

* cited by examiner

METHOD AND SYSTEM FOR SCHEDULED UPLINK TRANSMISSION IN A WIRELESS NETWORK

CROSS-REFERENCE TO RELATED APPLICATIONS

This application is a National stage of International Application No. PCT/CN2019/075213, filed Feb. 15, 2019, which claims priority to International Application No. PCT/CN2018/076920, filed Feb. 16, 2018, which are hereby incorporated by reference.

TECHNICAL FIELD

Embodiments of the invention relate to the field of wireless communications, and more specifically, relate to a method and system for scheduled uplink transmission in a wireless communication network.

BACKGROUND

Channel interference refer to two or more network devices transmitting their respective data in a shared channel simultaneously, and the transmission results in data collision and the data can't be decoded correctly at one or more destination network devices. Contention-based protocols (CBPs) allow multiple users to share the same spectrum by defining the events that must occur when two or more transmitters attempt to simultaneously access the same channel, and by establishing rules by which a transmitter provides reasonable opportunities for other transmitters to operate. Such protocols may consist of procedures for initiating new transmissions, procedures for determining the state of the channel (available or unavailable), and procedures for managing retransmissions in the event of a busy channel. CBPs include listen-before-talk (LBT), Aloha protocol, multiple access with collision avoidance (MACA), carrier sense multiple access (CSMA), distributed coordination function (DCF), point coordination function (PCF), and the derivatives/enhancements of these examples. Note that interference and collision are two terms used interchangeably within this document.

Listen-before-talk (LBT) and its variations have been adopted widely in wireless networks. Yet LBT have its drawbacks in high capacity networks or networks with similar characteristics. A high capacity network may implement high-gain, directional beamforming with massive number of antennas (typically realized with array antennas), which may increase a network's throughput while mitigating interference. Such new technologies in a high capacity wireless network are often collectively referred to as new radio (NR), and wireless networks implementing the NR technologies are often referred to as NR systems. The directional transmission in NR is the opposite to the legacy omni-directional transmission, and exposes drawbacks in LBT, including the following:

(1) Hidden node (also referred to as hidden terminal) problem. FIG. 1A illustrates a hidden node problem using LBT. The wireless network has two access nodes (ANs), AN1 and AN2 at references 102 and 104 respectively, and two user equipment (UEs), UE1 and UE2 at references 122 and 124 respectively. LBT is implemented for channel interference resolution. At task box 1, AN1 transmits data directionally and its transmission reaches UE1. Because the transmission by AN1 is directional, while AN2 is listening for another node's transmission at task box 2 when AN1 transmits, it can't detect AN1's transmission, thus it assumes that the channel shared with AN1 is free, and AN2 transmits data to its target node UE2. Yet because of the directional transmission of AN2 reaches not only the intended UE2 but also UE1, AN2's transmission interferes with AN1's transmission. Thus, for AN2, AN1 is a hidden node in its listening.

(2) Exposed node (also referred to as exposed terminal) problem. FIG. 1B illustrates an exposed node problem using LBT. The wireless networks also have the access nodes AN1-AN2 and UEs UE1-UE2. At task box 1, AN1 transmits data directionally and its transmission reaches not only the intended UE1, but also AN2. At task box 2, when AN2 has data to transmit to UE2, AN2 listens the channel and detects interference, and AN2 does not transmit to UE2. Yet since AN2 would transmit directionally to reach UE2, AN2's transmission would interfere little with AN1's transmission, and UE2 would be able to receive AN2's transmission, despite LBT indicates that there is a channel interference. Thus, LBT causes a false alarm. For AN2, AN1 is a (wrongly) exposed node using LBT.

(3) Deafness problem, where a receiver is unable to hear the directional transmission of its counterpart transmitter.

Listen-after-talk (LAT) may resolve the hidden node and exposed node problems. One reason of LBT's inefficiency is that in a high gain beamforming system such as a NR system, the difference between the sensed power at a source node and the interference power at the destination node is large. LBT relies on listening at the transmitter side to determine if there will be interference at the receiver side and thus large difference of power between them may result in severe problems. To solve it, LAT involves the receiver to sense the channel directly. Another motivation for LAT is the low interference environment in a high capacity network, where the sheer number of collisions for naïve direct transmissions is low. For this reason, LAT adopts a different logic compared to LBT, including: the default mode for transmitter is "to send" and data is not sent only when it is confirmed that channel is occupied by interfering transmissions. An important idea is that a source node transmits when data packets arrive and LAT solves interferences detected by the destination node. Yet, numerous challenges remain to resolve the interferences.

SUMMARY

Embodiments of the invention offer efficient ways to resolve channel interference in a wireless network using a coordination indicator for scheduled uplink transmission. In a wireless network including base station(s) and user equipment(s), a user equipment transmits data when it has data to transmit and has received a resource permission to transmit. Embodiments of the invention facilitate an efficient transmission to minimize the impact of channel interference.

BRIEF DESCRIPTION OF THE DRAWINGS

The invention may best be understood by referring to the following description and accompanying drawings that illustrate embodiments of the invention. In the drawings.

DETAILED DESCRIPTION

Figure 1A:
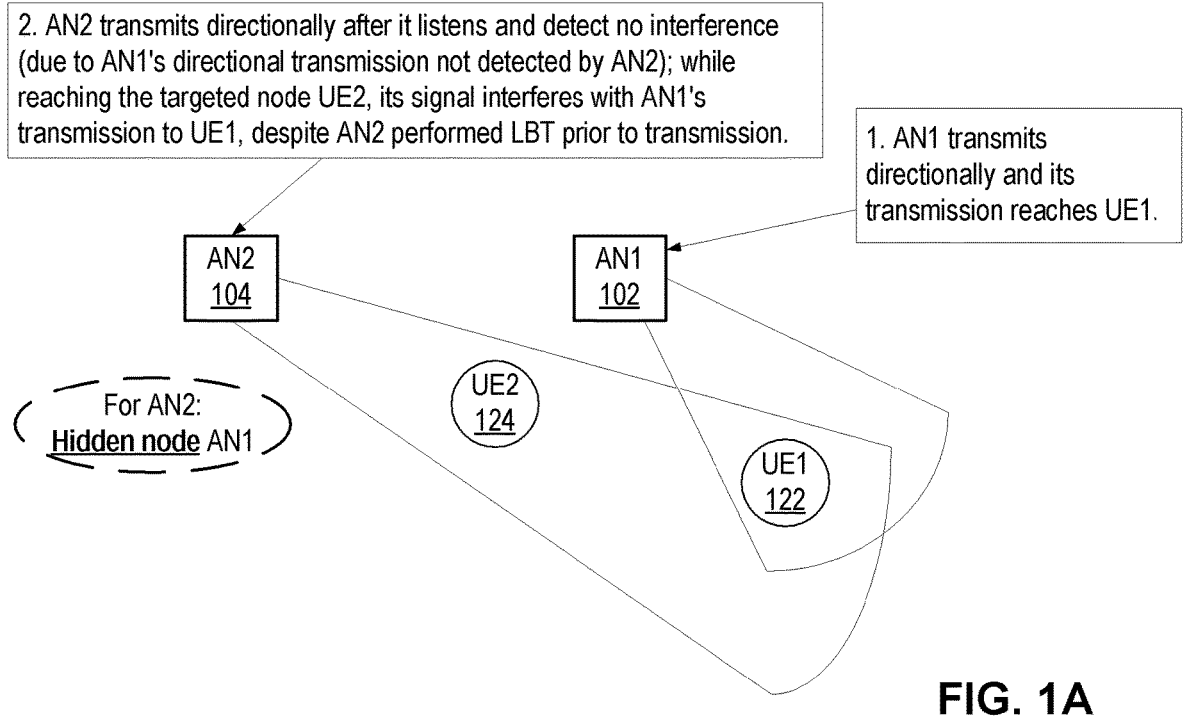
FIG. 1A illustrates a hidden node problem using listen-before-talk (LBT).
Figure 1B:
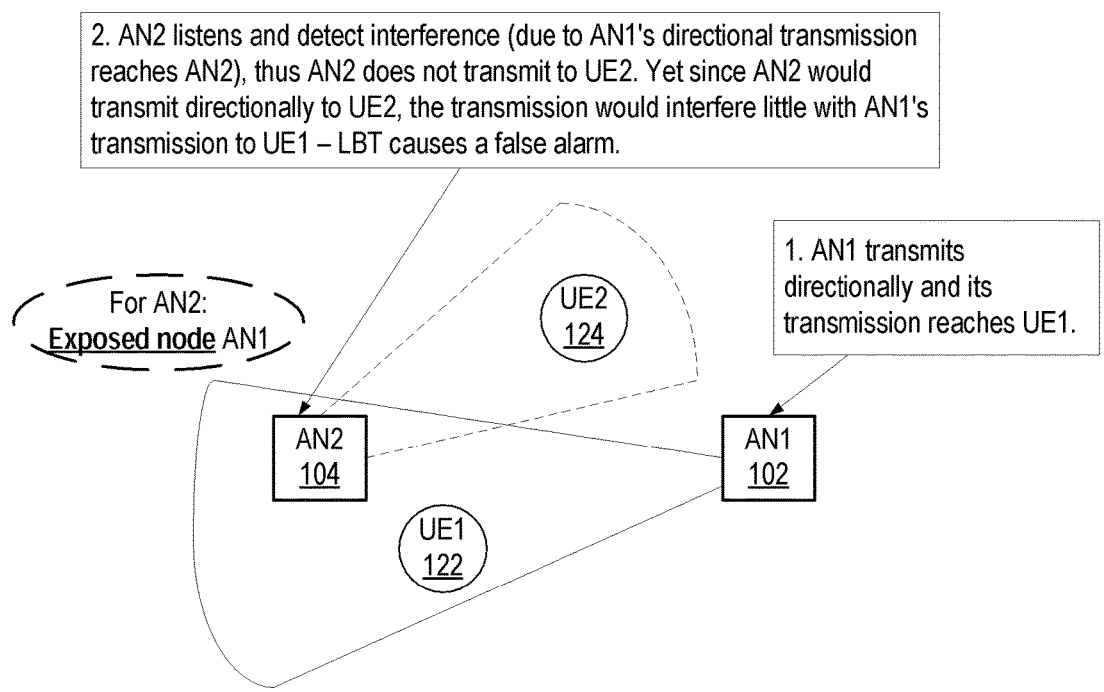
FIG. 1B illustrates an exposed node problem using LBT.

The following description describes methods, apparatus, and computer programs for scheduled uplink transmission to resolve channel interference in a wireless communication network using a coordination indicator. In the following description, numerous specific details such as logic implementations, opcodes, means to specify operands, resource partitioning/sharing/duplication implementations, types and interrelationships of system components, and logic partitioning/integration choices are set forth to provide a more thorough understanding of the present invention. One skilled in the art will appreciate, however, that the invention may be practiced without such specific details. In other instances, control structures, gate level circuits and full software instruction sequences have not been shown in detail in order not to obscure the invention. Those of ordinary skill in the art, with the included descriptions, will be able to implement proper functionality without undue experimentation.

Bracketed text and blocks with dashed borders (such as large dashes, small dashes, dot-dash, and dots) may be used to illustrate optional operations that add additional features to the embodiments of the invention. Such notation, however, should not be taken to mean that these are the only options or optional operations, and/or that blocks with solid borders are not optional in some embodiments of the invention.

Terms

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radiofrequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to a NIC. One or more parts of an embodiment of the invention may be implemented using different combinations of software, firmware, and/or hardware.

A wireless communication network is a network of electronic devices communicating using radio waves (electromagnetic waves within the frequencies 30 KHz-300 GHz). A wireless communication may follow wireless communication standards, such as new radio (NR), LTE-Advanced (LTE-A), LTE, wideband code division multiple access (WCDMA), High-Speed Packet Access (HSPA). Furthermore, the communications between the electronic devices such as network devices and terminal devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. While LTE and NR are used as examples to describe embodiments of the invention, the invention may apply to other wireless communication networks, including LTE operating in unlicensed spectrums, Multefire system, IEEE 802.11 systems.

A network device (ND) (also referred to as a node, the two terms are used interchangeably in this document) is an electronic device in a wireless communication network via which a terminal device accesses the network and receives services therefrom. One type of network devices may refer to a base station (BS) or an access point (AP), for example, a node B (NodeB or NB), an evolved NodeB (eNodeB or eNB), a next generation node B (gNB), remote radio unit (RRU), a radio header (RH), a remote radio head (RRH), a relay, and a low power node such as a femtocell and a picocell.

Another type of network device is terminal devices that may access a wireless communication network and receive services from the wireless communication network. For example, a terminal device may be a user equipment (UE), which may be a subscriber station (SS), a portable subscriber station, a mobile station (MS), or an access terminal (AT). The terminal device may be one of a mobile phone, a cellular phone, a smart phone, a tablet, a wearable device, a personal digital assistant (PDA), a portable computer, an image capture terminal device such as a digital camera, a gaming terminal device, a music storage and playback appliance, a vehicle-mounted wireless terminal device, a smart speaker, a set-top box.

Unlicensed spectrum includes spectrum that currently are not allocated/licensed to a dedicated use. NR systems may operate in both licensed and unlicensed spectrum, and spectrum sharing through a contention-based protocol (CBP) is applicable to both licensed and unlicensed spectrum. In some embodiments of a CBP, a network device may determine whether a channel is idle or occupied by detecting an energy level of the channel. When the energy level is over the threshold, the channel may be determined to be idle, otherwise it is busy.

Wireless Communication Network

Figure 2A:
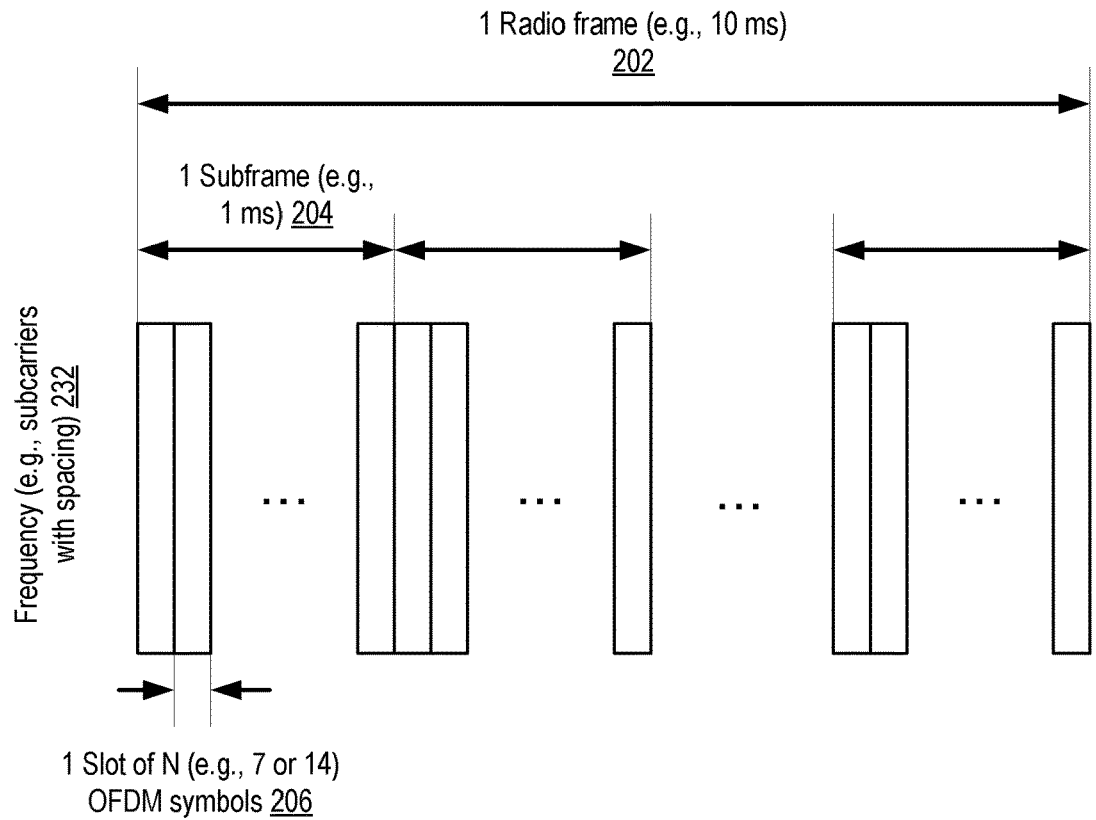
FIG. 2A illustrates an exemplary signal transmission hierarchy in a wireless network.

FIG. 2A illustrates an exemplary signal transmission hierarchy in a wireless network. The exemplary signal transmission hierarchy includes the transmission unit of frame such as radio frame 202. A radio frame 202 takes ten milliseconds to transmit in one embodiment. The frame may contain a number of subframes such as subframe 204. In this example, the radio frame 202 contains ten subframes, each takes one millisecond. Each subframe may contain a number of slots. For example, a subframe may contain two slots. Each slot such as the slot at reference 206 may contain a number of symbols. In one example, a slot contains either 7 or 14 symbols. The symbol is an orthogonal frequency-division multiplexing (OFDM) symbol in one embodiment.

The frame-subframe-slot-symbol hierarchy is an example of time domain hierarchy. In the frequency domain (as illustrated at reference 232), each symbol may be transmitted over a number of subcarriers. A symbol may be transmitted using a number of resource block (RB), each of which may contain 12 subcarriers in one embodiment. In one embodiment, each subcarrier includes a bandwidth (e.g., 7.5 kHZ or 15 kHZ) for transmission. One subcarrier x one symbol may be referred to as a resource element (RE), which is the smallest unit of resource to be allocated for signal transmission in one embodiment.

The illustrated frame structure offers an example for signal transmission. In this frame structure or other frame structures, data and signaling transmission is performed at a lowest level of time unit (symbol level in this case), which is included in a time unit (slot level in this example) a level over the lowest level of time unit in one embodiment. Data and signaling for one transmission from a source network device to a destination network device often use the same position within the signal transmission hierarchy, e.g., the same symbol position in consecutive slots (e.g., symbol #2 of each slot) or subframes, or in alternating slots (e.g., symbol #2 in every other slot) or subframes.

Figure 2B:
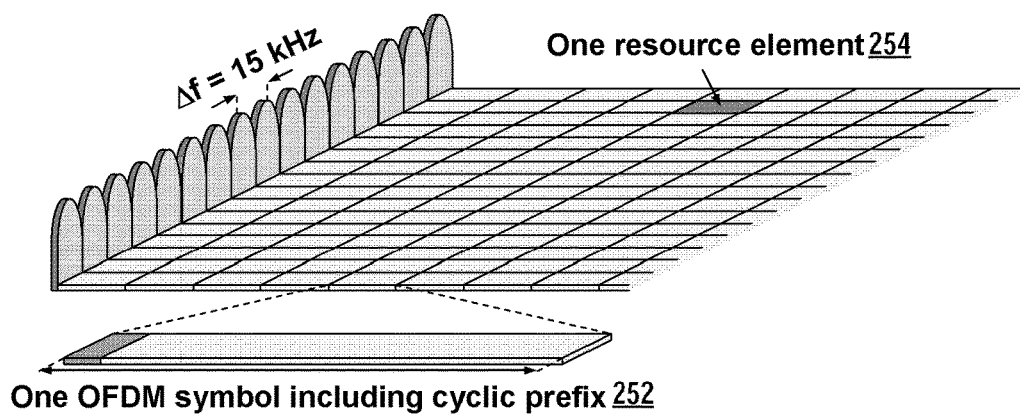
FIG. 2B illustrates resource elements used for data and signaling transmission.

FIG. 2B illustrates resource elements used for data and signaling transmission. The physical resources for transmission may be view as time and frequency grids as illustrated, where each resource element occupies a time period in the time domain and a frequency range in the frequency domain. Each OFDM symbol includes a cyclic prefix as illustrated at reference 252. Each OFDM symbol utilizes a number of resource elements. In this example, the subcarrier spacing is 15k Hz, and the resource element (RE) 252 occupies an orthogonal frequency-division multiplexing (OFDM) subcarriers within an OFDM symbol. A network device may allocate some resource elements for a particular type of signaling. Such allocation may be specified through identifying the time period in the time domain and the frequency range in the frequency domain in a signal transmission hierarchy; or it may be specified through identifying specific resource elements within the signal transmission hierarchy.

For communication control through downlink signaling, a wireless network may use PDCCHs (physical downlink control channels) to transmit downlink control information (DCI), which provides downlink scheduling assignments and uplink scheduling grants. The PDCCHs are in general transmitted at the beginning of a slot and relate to data in the same or a later slot (for mini-slots PDCCH can also be transmitted within a regular slot). Different formats (sizes) of the PDCCHs are possible to handle different DCI payload sizes and different aggregation levels (i.e. different code rate for a given payload size). A UE is configured (implicitly and/or explicitly) to blindly monitor (or search) for a number of PDCCH candidates of different aggregation levels and DCI payload sizes. Upon detecting a valid DCI message (i.e. the decoding of a candidate is successful and the DCI contains a ID the UE is told to monitor) the UE follows the DCI (e.g. receives the corresponding downlink data or transmits in the uplink). The blind decoding process comes at a cost in complexity in the UE but is required to provide flexible scheduling and handling of different DCI payload sizes.

Different NR use-cases (e.g. MBB (mobile broadband), URLLC (ultra-reliable low latency communication)) require different control regions (e.g. time, frequency, numerologies etc.) & PDCCH configurations (e.g. operating points etc.) PDCCHs in NR are transmitted in configurable/dynamic control regions called control resource sets (CORESET) enabling variable use-cases. A CORESET is a subset of the downlink physical resource configured to carry control signaling. It is analogous to the control region in LTE but generalized in the sense that the set of physical resource blocks (PRBs) and the set of OFDM symbols in which it is located is configurable.

In one embodiment, CORESET configuration in frequency allocation is done in units of 6 RBs using NR DL resource allocation Type 0: bitmap of RB groups (RBGs). CORESET configuration in time spans of 1-3 consecutive OFDM symbols. For slot based scheduling, the CORESET span at the beginning of a slot is at most 2 if demodulation reference signal (DMRS) is located in OFDM Symbol (OS) #2 and is at most 3 if DMRS is located in OS #3. A UE monitors one or more CORESETs. Multiple CORESETs can be overlapped in frequency and time for a UE.

In one embodiment, a NR system may utilize unlicensed frequency bands ranging from 5 GHz, 37 GHz, to 60 GHz and implement the enhanced LAT implementations disclosed in this document.

Listen-after-Talk (LAT) and Fast Acknowledgment

Figure 3:
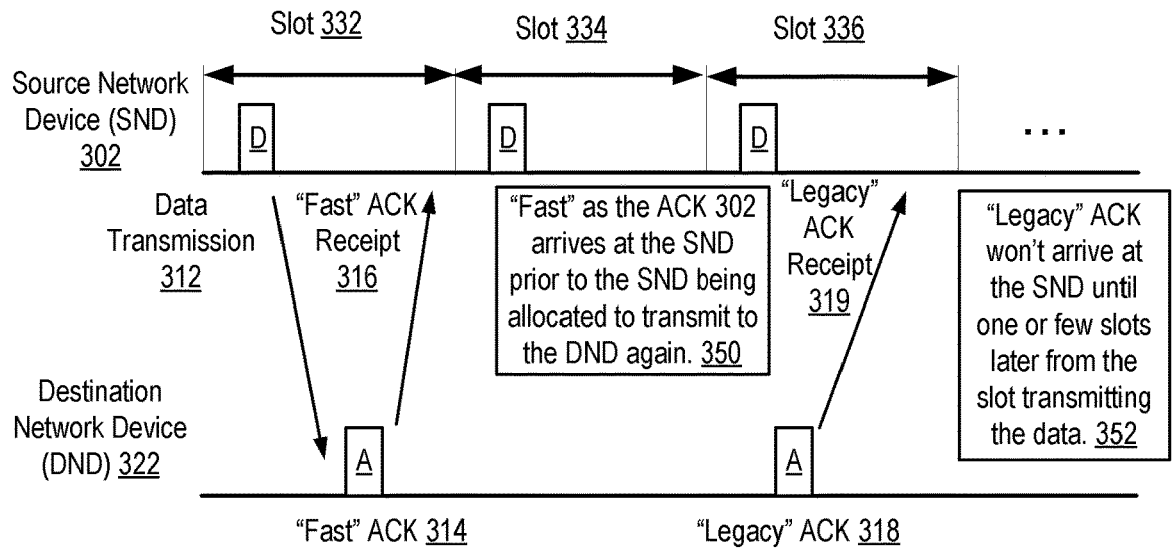
FIG. 3 illustrates listen-after-talk implementations in a wireless network per embodiments of the invention.

FIG. 3 illustrates listen-after-talk implementations in a wireless network per embodiments of the invention. In a simple listen-after-talk (LAT) implementation, a source network device (SND) 302 transmits its data to a destination network device 322, and then waits for an acknowledgement from the destination network device 322. Once the source network device 302 receives an acknowledgement indicating a successful transmission, it may transmit again. One issue with the LAT implementation is that the processing time of the data at the destination network device 322 can be long, and when the source network device 302 receives the acknowledgement from the destination network device 322, it has already missed the next allocated transmission time. For example, in a NR system where the subcarrier spacing is 120 KHz, one symbol is about 9 us, and the minimum time between a downlink transmission through a physical downlink shared channel (PDSCH) and its feedback to uplink is ~21 symbols, and that is longer than the time period of a 7-symbol or 14-symbol slot.

In FIG. 3, data transmits from the source network device 302 at the same slot position in each slot (e.g., symbol #2 at slots 332-336). The source network device 302 transmits its data in slot 332 at reference 312. The destination network device 322 finishes processing the data and transmits the acknowledgement 318 back to source network device 302, which receives the acknowledge at reference 319. The transmission of an acknowledgement after data being processed is known in the art, and we refer it as "legacy" acknowledgement. The source network device 302 does not receives the legacy acknowledgement 318 until late part of slot 336, by which time the source network device 302 has missed two slots to transmit the data. Obviously the missing of allocated transmission position at the source network device 302 slows down its transmission rate and a user may no longer experience the high capacity of the wireless network as the line rate indicates.

One embodiment of the invention provides a fast acknowledgement 314. As illustrated at reference 350, the acknowledgement is fast in the sense that it arrives at the source network device 302 prior to the source network device 302 being allocated to transmit to the destination network device 322 again. Because the acknowledgment receipt at 316 happens before the data is scheduled for transmission in the next slot (slot 334), the data is transmitted at the high transmission rate provided by the wireless network. Thus, by using the fast acknowledgement, the throughput of the data in the network is high than that of a network using a legacy acknowledgement.

The destination network device 322 may provide the fast acknowledgment by estimating whether data is received and whether the data may be decoded successfully without completing the data processing of received data.

For example, when the destination network device 322 is a terminal device (such as a user equipment), it knows that data is included in the received transmission from the source network device 302 when PDCCH with downlink assignment for the destination network device 322 is successfully decoded. Even when PDCCH is not detected, the destination network device 322 may predict whether data is transmitted by estimating the total energy in PDCCH part: if the total energy is significantly larger than the signaling power estimated based on historical information, the destination network device 322 may determine that strong interference may have distorted the PDCCH, and the PDCCH for the destination network device 322 has been transmitted. In a NR system, as the NR control resource set (CORESET) does not always occupy the entire operation bandwidth, the destination network device 322 may also estimate the presence of PDCCH by comparing received energy within the CORESET and that outside of the CORESET.

For another example, when the destination network device 322 is a base station, it may determine whether data is transmitted to it via detection of front-loaded demodulation reference signal (DMRS) if configured. Optionally the base station (e.g., an eNB or gNB) may determine that there is data transmitted to it according to another specific preamble designed with enhanced reliability at the head of uplink transmission. This specific preamble is to notify the base station that data has transmitted within the transmission signal.

The fast acknowledgement may be a positive one—the destination network device 322 detects data from the transmission signal and may decode the data successfully with a high probability. The fast acknowledgement may also be a negative one—the destination network device 322 detects data from the transmission signal yet can't decode the data successfully with a high probability (e.g., due to interference). The determination of whether the decoding will be successful does not require the decoding of the whole data; rather, one decoding a subset of data may be sufficient for the destination network device 322 to decide whether the probability of a successful decoding is high or not, and once the decision is made, the destination network device 322 may transmit the fast acknowledgement.

In one embodiment, the fast acknowledgment is indicted by one or more bits. For example, a bit value '1' may indicate an acknowledgment of no interference (meaning the interference is below an acceptable threshold thus the decoding is likely to be successful), while a bit value '0' may indicate an acknowledgement of interference, and the destination network device 322 may not decode the data successfully.

A wireless network may set an expected time period for the source network device 302 to receive the acknowledgement. For example, the expected time period may be set to be the time period of one time slot. In that embodiment, once the acknowledgement is not received by the time the data is scheduled for transmission in the next slot, the source network device 302 assumes that the data transmitted to the destination network device 322 has been lost (e.g., due to interference), and the talk in the listen-after-talk has failed, and the source network device 302 will proceed with remedial measures discussed herein.

When no acknowledgement is received by the defined time period, the destination network device may predict that there is data transmitted during the time period, and it may store the received transmission in a buffer, and it continues monitoring and try to determine whether it actually have data received by combining newly obtained signal with the saved transmission.

By providing the fast acknowledgment, embodiments of the invention allow a listen-after-talk operates faster, since the fast acknowledgement allows the listen after the talk to be completed faster (e.g., prior to the time that the data is scheduled for transmission in the next slot).

Coordination Indicator and Resource Coordination Zone

Embodiments of the invention may use a coordination indicator to coordination interference resolution in a wireless network. The coordination indicator may be transmitted along with data from a source network device to a destination network device. The coordination indicator is specified for a source and destination network device pair (sometimes referred to as a link). The coordination indicator configures how and where to transmit coordination messages if needed.

Figure 4A:
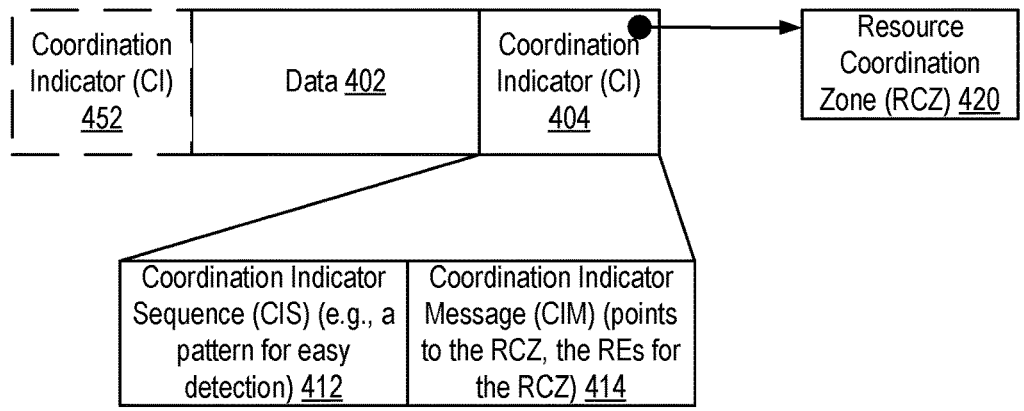
FIG. 4A illustrates implementations of a coordination indicator per embodiments of the invention.

FIG. 4A illustrates implementations of a coordination indicator per embodiments of the invention. The coordination indicator may be transmitted before or after its corresponding data as illustrated, where a coordination indicator 452 is transmitted before while an alternative coordination indicator 404 is transmitted after data 402. In some embodiments, transmitting the coordination indicator after the data is advantageous as the destination network device will attempt to decode the transmitted data first, and depending the data decoding status, the destination network device utilizes the coordination indicator.

In one embodiment, a coordination indicator such as the coordination indicator 404 is specific to the source network device, and a network device receiving the coordination indicator may identify from which source network device that the coordination indicator is transmitted from. The coordination indicator 404 includes a coordination indicator sequence (CIS) 412 and a coordination indicator message (CIM) 414. The CIS 412 includes a bit sequence so that the receiving network device may identify that a coordination indicator is detected. The CIS may reuse secondary synchronization sequence (SSS) or synchronization (SS) blocks.

The CIM 414 includes a message pointing to a resource coordination zone (RCZ) such as RCZ 420. The CIM 414 may indicate where the RCZ 420 is located in the time period and frequency range within the time and frequency grids as illustrated in FIG. 2B. The CIM 414 may also configure the messages that are to be transmitted within the RCZ. For example, the CIM 414 may configure how many resource elements to use by a message within the RCZ. The coordination indicator, through the CIM 414, acts as a pointer to point to the resource coordination zone so that the receiving network device knows where to send messages to resolve interference with the sending network device.

Figure 4B:
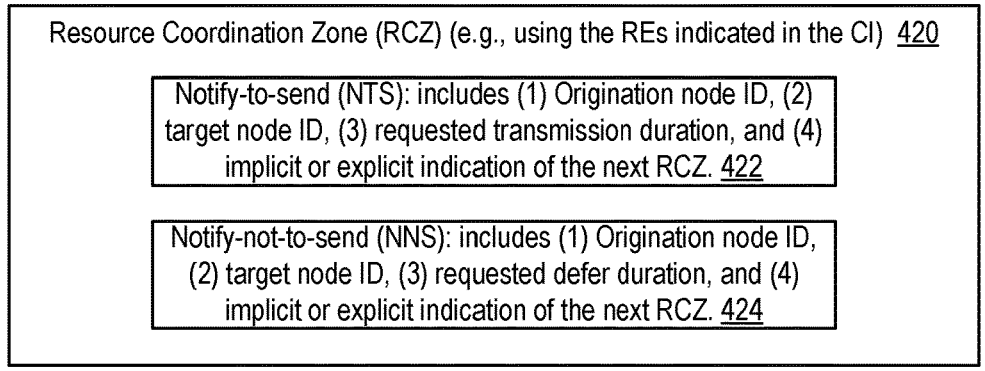
FIG. 4B illustrates the messages to be transmitted and detected in a resource coordination zone per embodiments of the invention.

FIG. 4B illustrates the messages to be transmitted and detected in a resource coordination zone per embodiments of the invention. The illustrated resource coordination zone is the RCZ 420, and messages communicated within the RCZ 420 uses the configuration defined in CIM 414 in one embodiment. In an alternative embodiment, the configuration of the messages is predefined and a network device does not refer to CIM 414 to understand the configuration of the messages within the RCZ 420.

The messages exchanged within the RCZ 420 includes a notify-to-send (NTS) and a notify-not-to-send (NNS) in one embodiment. In one embodiment, a NTS message such as the NTS 422 includes one or more of the following fields: (1) an origination node ID (OID) indicating where the NTS message is sent from; (2) a target node ID (TID) indicating where the NTS message is intended to reach; (3) a requested transmission duration indicating how long the intended transmission is expected to last; and (4) an implicit or explicit indication of the next RCZ where the receiving network device may resolve an interference/conflict with the origination node. When the next RCZ is predefined, the value within field (4) may be implicit (e.g., without value) or ignored. In some embodiments, values for one or more of fields (1)-(3) also take default values, and the fields/corresponding values may be omitted. A receiving node monitors the RCZ 420 and decodes values of these fields of an NTS message when the NTS message is detected. In some embodiments, values for one or more if fields (1)-(3) take default values, and the fields/corresponding values may be omitted.

An NTS message is transmitted from the origination node and it notifies the destination node to transmit in the indicated transmission duration. Additionally, the NTS message notifies the other source nodes (network devices) that are not the destination node to defer transmission in the indicated duration. In response to receiving the NTS message, a destination node (network device) may send an NNS to its source node to defer the source node's transmission.

An NNS message such as the NNS 424 includes one or more of the following fields: (1) an origination node ID (OID) indicating where the NNS message is sent from; (2) a target node ID (TID) indicating where the NNS message is intended to reach; (3) a requested transmission duration indicating how long the deference of transmission is expected to last; and (4) an implicit or explicit indication of the next RCZ where the receiving network device may resolve an interference/conflict with the origination node. Similar to NTS message, when the next RCZ is predefined, the value within field (4) may be implicit (e.g., without value) or ignored. In some embodiments, values for one or more of fields (1)-(3) also take default values, and the fields/corresponding values may be omitted. A receiving node monitors the RCZ 420 and decodes values of these fields of an NNS message when the NNS message is detected.

An NNS message notifies the target node specified in the target node field to defer (stop/halt) transmission for the indicated deference duration. Other receiving nodes that are not the target node may ignore the NNS message.

Figure 5A:
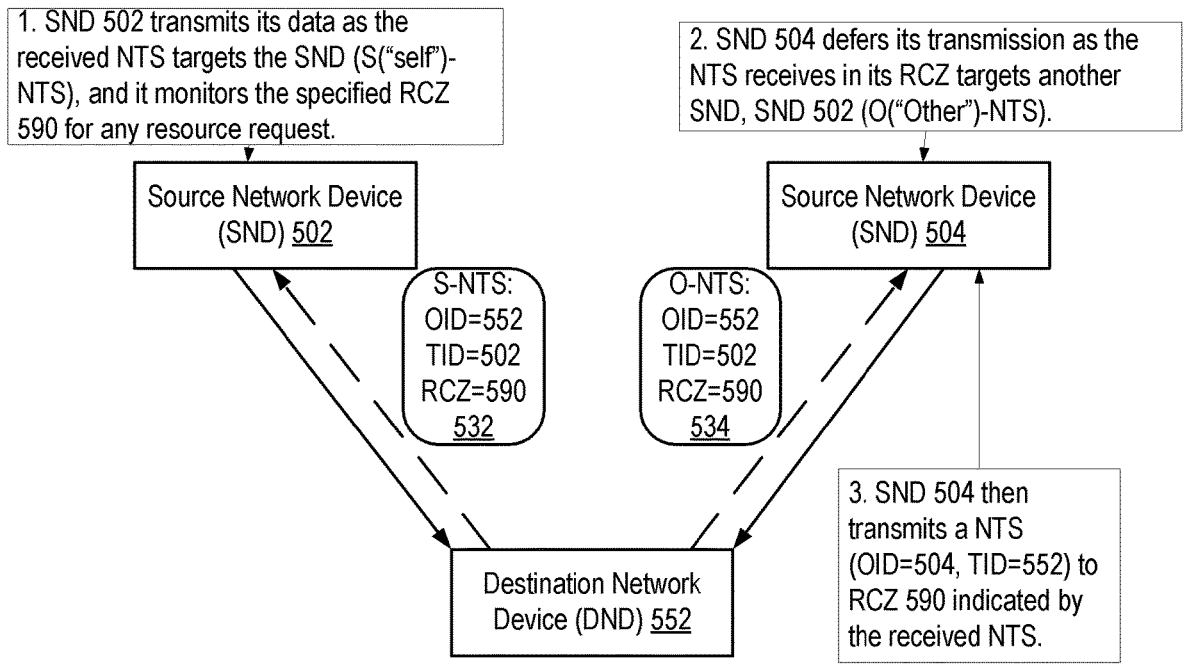
FIG. 5A illustrates the operations of a notify-to-send (NTS) message within a resource coordination zone per one embodiment of the invention.

FIG. 5A illustrates the operations of a notify-to-send (NTS) message within a resource coordination zone per one embodiment of the invention. The wireless network includes source network devices 502 and 504, and a destination network device 552. Data from the source network devices 502 and 504 are transmitted to the destination network device 552. The destination network device 552 sends out an NTS that is detected by both source network devices 502 and 504. An NTS (or an NNS) message being detected by multiple network devices is not uncommon in a wireless network because multiple network devices may monitor the same resource coordination zone.

The transmitted NTS 532 indicating (1) an origination node ID being 552, (2) a target node ID being 502, and (3) the next RCZ is identified as RCZ 590. The requested transmission duration is absent and the source network device may take a default value. Upon receiving the NTS message, the source network device 502 recognizes that it is the target node of the NTS message, and it transmits its data in task box 1. The NTS may be referred to as a self-NTS (S-NTS) for the source network device 502. Additionally, it starts to monitor the specified RCZ 590 for any resource request by another network device as illustrated in task box 1.

The source network device 504 also receives the NTS. Yet the source network device 504 recognizes that it is not the targeted node, thus it defers its data transmission to the destination network device 552 in task box 2. For the source network device 504, the NTS may be referred to as another-NTS (O-NTS) since the NTS targeted to another node. Upon deferring its data transmission, the source network device 504 may transmit another NTS in the specified RCZ 590 in task box 3 when the source network device 504 has more data to transmit after the deference. The other NTS indicates that it has data to transmit to the destination network device 552. Another network device, the source network device 502, which monitors the RCZ 590 (as described in task box 1), may detect the other NTS, and defer to the source network device 504 in the next transmission.

Figure 5B:
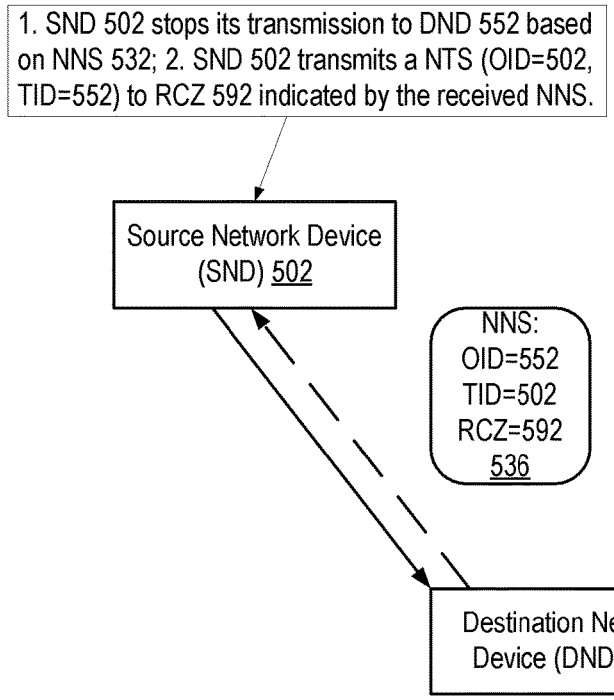
FIG. 5B illustrates the operations of a notify-not-to-send (NNS) message within a resource coordination zone per one embodiment of the invention.

FIG. 5B illustrates the operations of a notify-not-to-send (NNS) message within a resource coordination zone per one embodiment of the invention. The wireless network includes the same source network devices and destination network device as in FIG. 5A. The destination network device 552 sends out an NNS that is detected by both source network devices 502 and 504. The transmitted NNS 536 indicating (1) an origination node ID being 552, (2) a target node ID being 502, and (3) the next RCZ is identified as RCZ 592. The requested transmission duration is absent and the source network device may take a default value. Upon receiving the NNS message, the source network device 502 recognizes that it is the target node of the NNS message, and it stops its data transmission to the destination network device 552. Additionally, if the source network device 504 has more data to transmit, it transmits a NTS to the RCZ 592 identified in the NNS 536. The NTS will notify the transmitting network device that source network device 504 plans to transmit and is in contention for transmission opportunity to the destination network device 552.

By exchanging the NTS and NNS messages in designated resource coordination zone, network devices that have data to transmit can coordinate with each other and share the same communication channel.

Scheduled Uplink Transmission

In some embodiments, a source network device transmits data when it has been granted a resource permission to transmit a destination network device (by a destination network device or another control/coordination unit). In a wireless network, a terminal device such as user equipment may schedule uplink transmission with dynamic uplink grant. For example, in an NR system, a gNB may schedule uplink grants for user equipment (UEs) in its coverage. Scheduled uplink can be adapted to different implementation scenarios thus is more flexible. Embodiments of the invention implement listen-after-talk (LAT) in scheduled uplink transmission. Note that in a scheduled uplink transmission, for uplink data transmission, the source network device is a terminal device, and the destination network device is a base station. On the other hand, for grant issuing by a base station, the source network device is the base station, and destination network device is a terminal device.

One challenge with implementing LAT in scheduled uplink transmission is response time. For example, once a gNB schedules a UE to transmit uplink data, some UEs may take processing time longer than a slot duration. In an NR system with 120 KHZ subcarrier spacing (SCS), one symbol duration is about 9 us. Yet the time difference between downlink control information (DCI) that includes uplink grant and uplink data is about 31 symbols, which is much longer than a slot duration of 7 or 14 symbols. Thus, one embodiment of the invention uses two-stage uplink grants: The first stage uplink grant includes data transmission information, and the second stage uplink grant triggers an uplink transmission. A base station issues two stages of uplink grants to trigger uplink data transmission from a terminal device.

In one embodiment, a first stage uplink grant includes data transmission information such as rank indicator (RI), pre-coding matrix indicator (PMI), modulation and coding scheme (MCS). The first stage uplink grant may be transmitted through DCI. In one embodiment, the first stage uplink grant does not specify when a receiving terminal device may start to transmit. Once a terminal device such as a UE receives the first stage uplink grant, it may prepare data for uplink transmission. Then after receiving an acknowledgement of the first stage uplink grant, the base station issues a second stage uplink grant, which triggers the receiving terminal device to transmit uplink data. For example, the terminal device may transmit data within one to four symbols after receiving the second stage uplink grant. Thus, the time difference between downlink control information (DCI) that includes uplink grant and uplink data is much shorter, and makes the two-stage uplink grant more efficient. The first stage uplink grant may be valid for a relatively long period of time (e.g., several slot durations), and it allows a range of time for the second stage uplink grant to be transmitted to the terminal device, which then transmits uplink data.

The terminal device transmits a "fast" acknowledgement upon receiving the first stage grant. The fast acknowledgement is one discussed relating to FIG. 3. The acknowledgment may be received at the base station prior to the time that the base station is ready to transmit the second stage grant.

Figure 6:
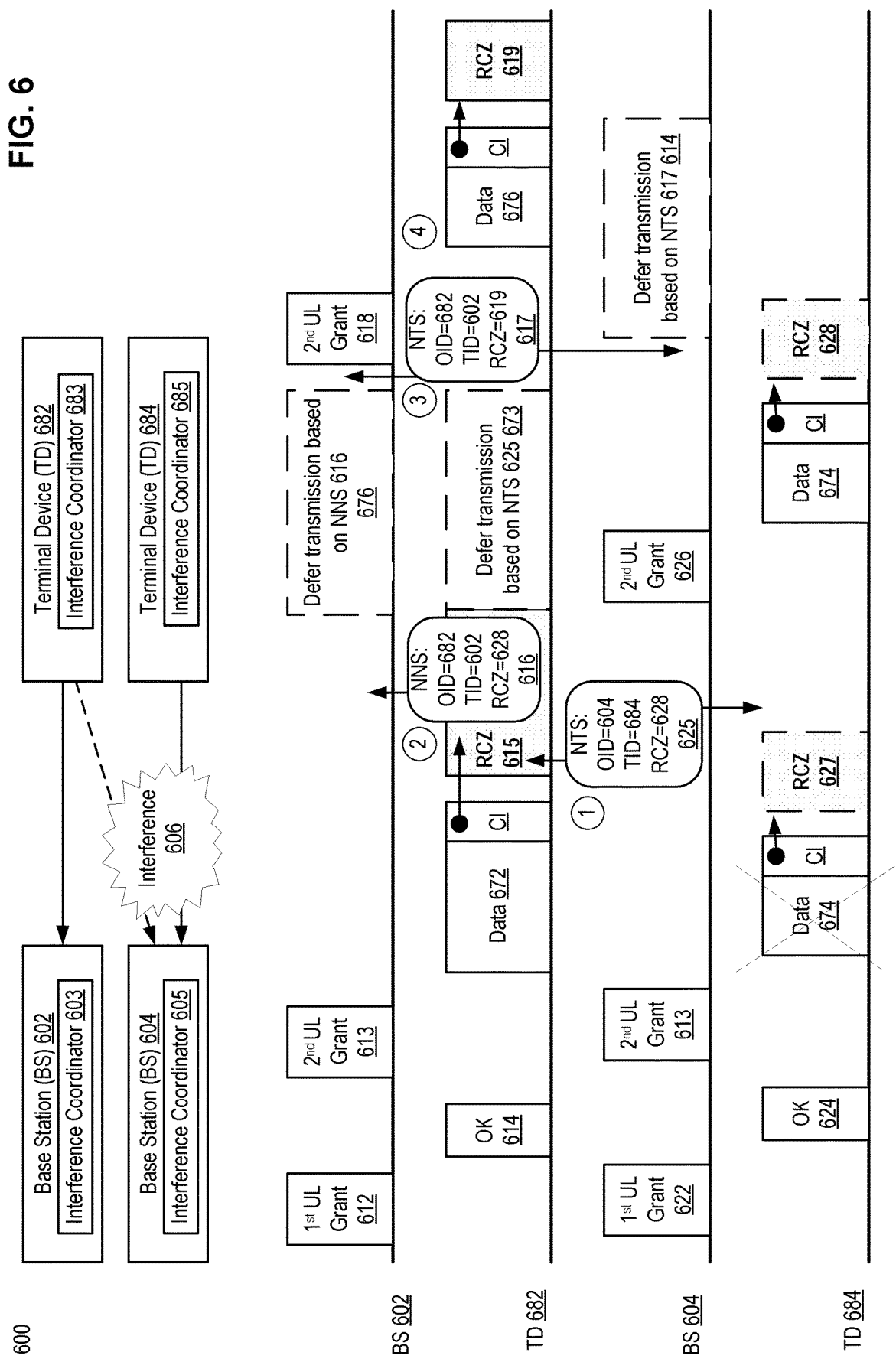
FIG. 6 illustrates the operations of using coordination indicators to avoid channel interference per one embodiments of the invention.

FIG. 6 illustrates the operations of using coordination indicators to avoid channel interference per one embodiments of the invention. The wireless network 600 includes two base stations 602 and 604, and two terminal devices 682 and 684. While the uplink transmission by the terminal device 682 aims at transmitting to the base station 602 and not the base station 604, its transmission interferes with the transmission of the terminal device 684 to the base station 604, and results in interference 606. Each of the base stations and terminal devices includes an interference coordinator, including interference coordinator 603, 605, 683, and 685. In some embodiments, an interference coordinator in a base station is configured to perform operations only for the base station and the one in the terminal device is configured to perform operations only for the terminal network device. In alternative embodiments, the interference coordinator in a network device may perform operations for both base station and terminal device for simplicity of circuit/software design (e.g., using a single system-on-a-chip (SoC) for the interference coordination). The circles 1-4 designate notable operations in utilizing coordination indicators to resolve channel interference.

At the beginning, both base stations 602 and 604 transmit first stage grant to their respective terminal devices 682 and 684. Assume that the transmissions are successful in both cases, and the terminal devices 682 and 684 transmit back fast acknowledgements 614 and 624 ("OK") indicating no interference. Then both base stations 602 and 604 transmit their respective second stage grants to their terminal devices. Once the terminal devices 682 and 684 receives the grant, they send data 672 and 674 to their respective base stations 602 and 604. The coordination indicator for data 672 to be transmitted to the base station 602 points to a resource coordination zone (RCZ) 615 and the coordination indicator for data 674 to be transmitted to the base station 604 points to a RCZ 627. The base station 602 receives the transmitted data 672 without issue (as the top of the figure shows that the link between the two has no interference). In contrary, the base station 604 fails to receive the data transmission from the terminal device 684 due to interference 606.

Once the base station 604 determines it can't decode the data, it listens to the channel between the base station 604 and base station 684. In one embodiment, the base station knows that data are transmitted based on DMRS as discussed herein above relating to FIG. 3. In an alternative embodiment, it hears the coordination indicator transmitted by the terminal device 684 and understands that the terminal device 684 attempts to transmit data to itself. Additionally, it also hears the coordination indicator transmitted by the terminal device 682 and understands that the terminal device 682's resource coordination zone is RCZ 615. The base station 604 wants to announce that the base station 604 plans to transmit. Thus, at Circle 1, the base station 604 transmits an NTS 625 with OID=604, TID=684, and a new RCZ 628 indicated. The NTS 625 is transmitted to the RCZ 615 that is monitored by the terminal device 682. Upon detecting the NTS 625, the terminal device 682 then defers its transmission at reference 673.

At Circle 2, the terminal device 682 detects the NTS 625, and determines that the NTS is an O-NTS that is for transmission of another node, it transmits an NNS 616 with OID=682, TID=602, and the RCZ 628 indicated in the received NTS. The NNS 616 causes the base station 602 defers its transmission (such as an uplink grant) at reference 676.

Since the terminal device 682 is deferring its transmission, interference 606 no longer exists. The base station 604 then transmits another second stage grant, grant 626, which results in uplink data 674 to be transmitted, successfully to the base station 604. Note that data 674 is transmitted with a coordination indicator that points to RCZ 628, which is indicated in the received NTS 625.

At Circle 3, the terminal device 682 still has data to transmit. The terminal device 682 then sends an NTS 617 to notify its intent to transmit. The NTS has OID=682, TID=602, and a new RCZ 619 indicated. The NTS 617 is sent to base station 602 and base station 604. Based on the NTS 617, the base station 604 defers its transmission at reference 614.

The base station 602 transmits another second stage uplink grant 618, which results in transmission of uplink data 676, along with a coordination indicator that points to the RCZ 619 indicated in the NTS 617 at Circle 4.

By using the coordination indicator pointing to a sequence of resource coordination zones and NTS/NNS messages, the base stations 602/604 and terminal devices 682/684 may get around channel interference such as interference 606 and allow both terminal devices 682 and 684 to communicate and transmit uplink data to their respective base stations.

Operations of Some Embodiments

The operations in the flow diagram will be described with reference to the exemplary embodiments of the other figures. However, the operations of the flow diagram can be performed by embodiments of the invention other than those discussed with reference to the other figures, and the embodiments of the invention discussed with reference to these other figures can perform operations different than those discussed with reference to the flow diagram.

Figure 7:
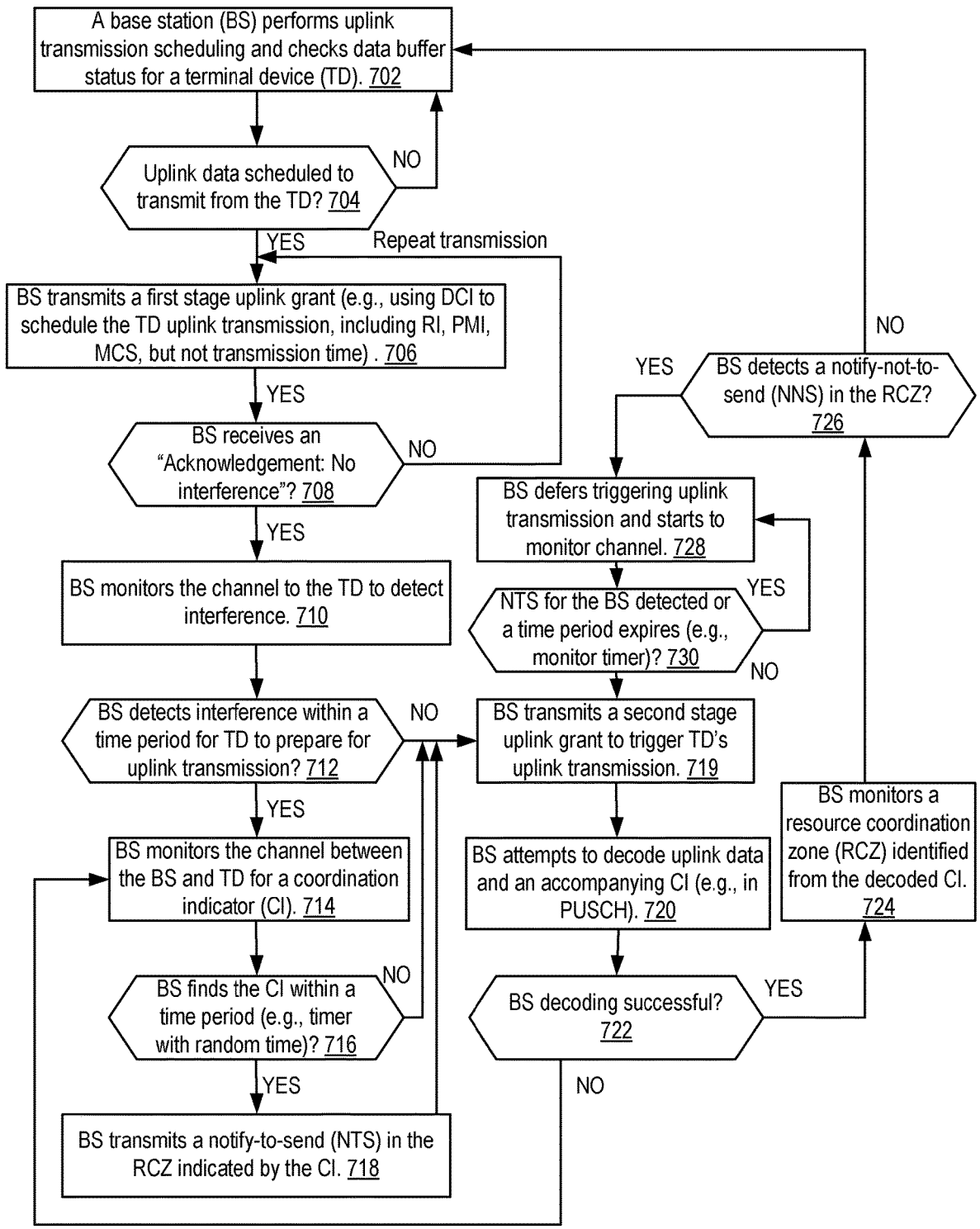
FIG. 7 illustrates operations of scheduled uplink transmission by a base station to resolve channel interference in a wireless network using a coordination indicator per one embodiment of the invention.

FIG. 7 illustrates operations of scheduled uplink transmission by a base station to resolve channel interference in a wireless network using a coordination indicator per one embodiment of the invention. The operations may be performed by an interference coordinator such as the interference coordinators 603 and 605 in the base station 602 and 604.

At reference 702, a base station performs uplink transmission scheduling and check data buffer status for a terminal device. The terminal device periodically updates the base station whether the terminal device has data (any how much data) to transmit to the base station. At reference 704, the base station determines whether there are data to be scheduled to be transmitted from the terminal device. If the base station determines that the terminal device has data to be scheduled to transmit to the base station at reference 704, the flow goes to reference 706, otherwise, the flow returns to reference 702 and waits for the terminal device has data to be transmitted to the base station.

At reference 706, the base station transmits a first stage uplink to the terminal device. As discussed herein above, the first stage uplink grant may include data transmission information such as rank indicator (RI), pre-coding matrix indicator (PMI), modulation and coding scheme (MCS), and not include information as of when the receiving terminal device may start to transmit its uplink data in one embodiment.

At reference 708, the base station monitors for an acknowledgment indicating no interference from the terminal device. The acknowledgement may be received at the base station prior to the time that the base station is ready to transmit the second stage grant. If no acknowledgement is received, the flow goes back to reference 706, and the first stage uplink grant is transmitted again. Otherwise, the flow goes to reference 710, where the base station monitors the channel between the base station and the terminal device.

At reference 712, the base station determines whether an interference is detected within a time period for the terminal device to prepare for an uplink transmission. If no interference is detected, the flow goes to reference 719, where the base station transmits a second stage uplink grant to trigger the terminal device to transmit its data uplink. Note that the base station performs a listen-before-talk (LBT) before issuing the second stage uplink grant. Thus, embodiments of the invention incorporate features in LBT too.

One the other hand, if the base station detects interference, the flow goes to reference 714, where the base station monitors the channel between the base station and the terminal device for a coordination indicator. Note that the base station may know that data is transmitted but interfered by detecting DMRS as discussed herein above. The base station is given a period of time specified by a timer to find a coordination indicator associated with the data transmitted. The period of time may be predetermined or randomly/pseudo-randomly generated. If the base station detects the coordination indicator, the flow goes to reference 718, where the base station transmits a notify-to-send (NTS) in the resource coordination zone indicated by the coordination indicator. The NTS 625 is an example of the NTS in reference 718.

If the timer expires without finding the coordination indicator at reference 716 or the NTS is transmitted at reference 718, the flow goes to reference 719, where the base station transmits the second stage uplink grant to the terminal device to trigger the uplink transmission.

After the second stage uplink grant is issued, the base station attempts, at reference 720, to decode uplink data, which comes with a corresponding coordination indicator. The decoding may use a physical uplink shared channel (PUSCH) in one embodiment.

At reference 722, the base station determines whether the decoding is performed successful. If not, the base station assumes that the channel is interfered, and the flow goes back to reference 714. Otherwise, the flow goes to reference 724, where the base station monitors a resource coordination zone identified by the coordination indicator decoded in reference 720.

At reference 726, the base station determines whether it detects a notify-not-to-send (NNS) in the monitored resource coordination zone. If an NNS is detected (NNS 616 is an example), the flow goes to reference 728, and the base station defers triggering an uplink transmission and starts to monitor the channel. Then at reference 730, the base station determines if an NTS for the base station is detected or a time period expires (similar to the time period in reference 716). The NTS 617 is an example of the NTS in reference 730.

If no NNS is detected at reference 726, the flow goes back to reference 702.

Figure 8:
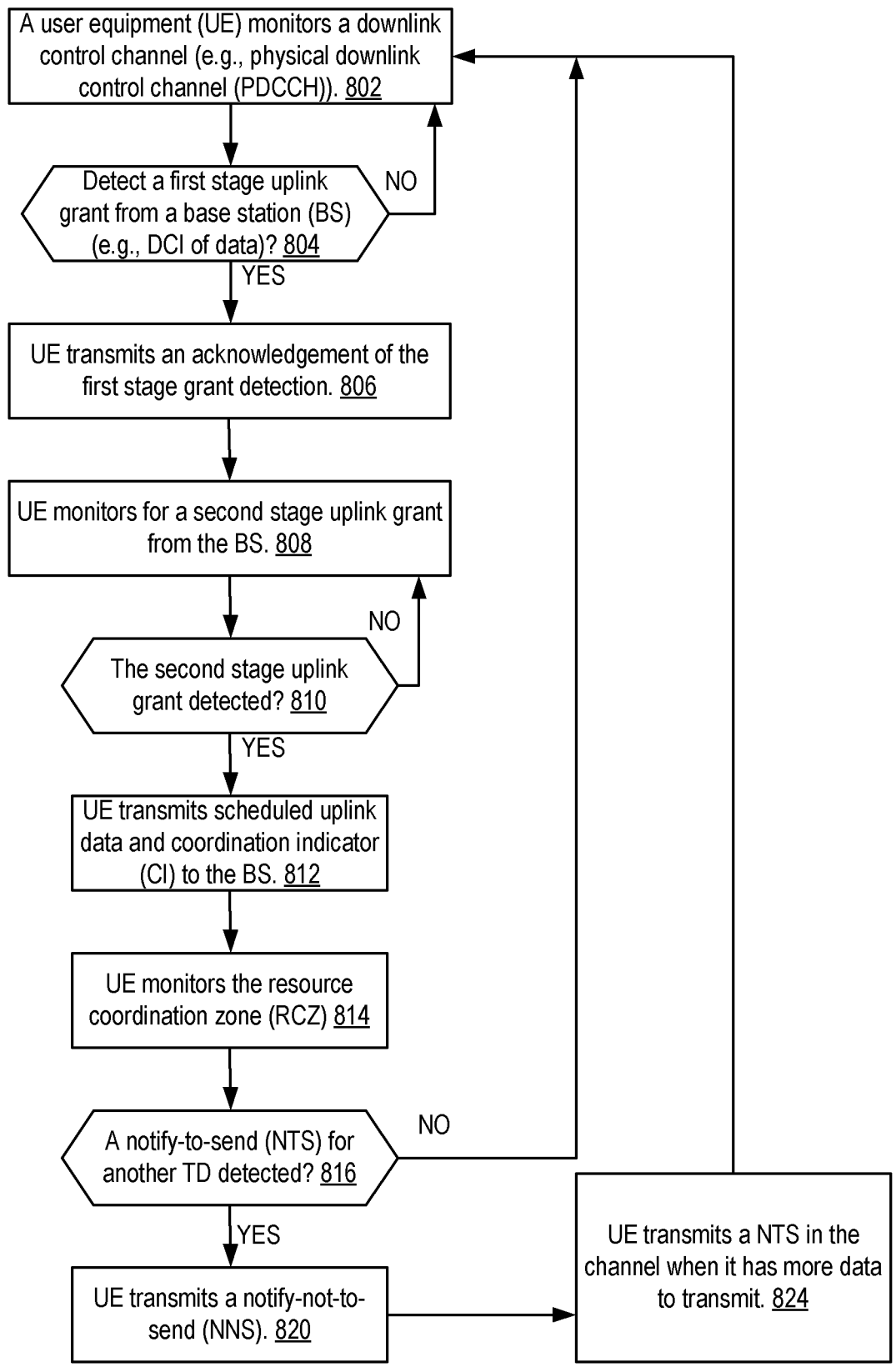
FIG. 8 illustrates operations of scheduled uplink transmission by a terminal device to resolve channel interference in a wireless network using a coordination indicator per one embodiment of the invention.

FIG. 8 illustrates operations of scheduled uplink transmission by a terminal device to resolve channel interference in a wireless network using a coordination indicator per one embodiment of the invention. The operations may be performed by an interference coordinator such as the interference coordinators 683 and 685 in the terminal devices 682 and 684.

At reference 806, the terminal device transmits an acknowledgement indicating a successful detection of the first stage uplink grant to the base station. The terminal device then monitors for a second stage uplink grant from the base station at reference 808. The terminal device determines at reference 810 whether the second stage uplink grant is detected at reference 810. If not, the flow goes back to reference 808; otherwise the flow goes to reference 812.

At reference 806, the terminal device transmits an acknowledge indicating a successful detection of the first stage grant to the base station. The terminal device then monitors for a second stage uplink grant from the base station at reference 808. The terminal device determines at reference 810 whether the second stage uplink grant is detected at reference 810. If not, the flow goes back to reference 808; otherwise the flow goes to reference 812.

The terminal device transmits scheduled uplink data and a corresponding coordination indicator to the base station at reference 812. The coordination indicator points to a resource coordination zone as discussed herein above. The terminal device then monitors the resource coordination zone at reference 814.

At reference 816, the terminal device determines whether a notify-to-send (NTS) for another terminal device is receive. If no such NTS is received, the flow goes back to reference 802 to prepare for another uplink transmission. On the other hand, if an NTS is received (the NTS 625 is an example), the flow goes to reference 820, where the terminal device transmits a notify-not-to-send (NNS). The NNS 616 is an example of the NNS in reference 820.

The flow then goes to reference 824, where the terminal device transmits an NTS in the communication channel when it has more data to transmit. The NTS 617 is an example of the NTS in reference 824. Afterward, the flow goes back to reference 802 to be ready for uplink data transmission again.

Figure 9:
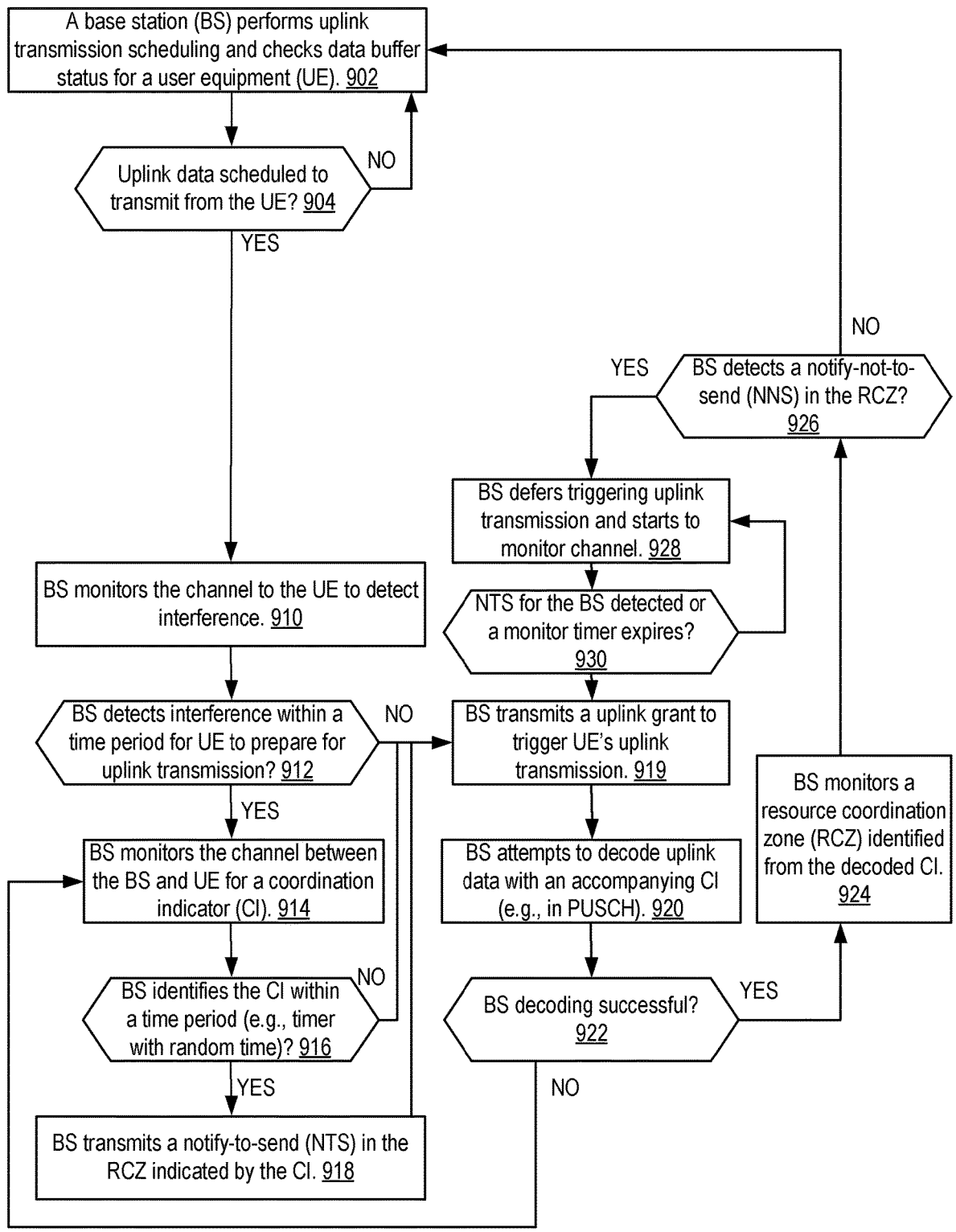
FIG. 9 illustrates operations of scheduled uplink transmission by a base station to resolve channel interference in a wireless network using a coordination indicator per another embodiment of the invention.
Figure 10:
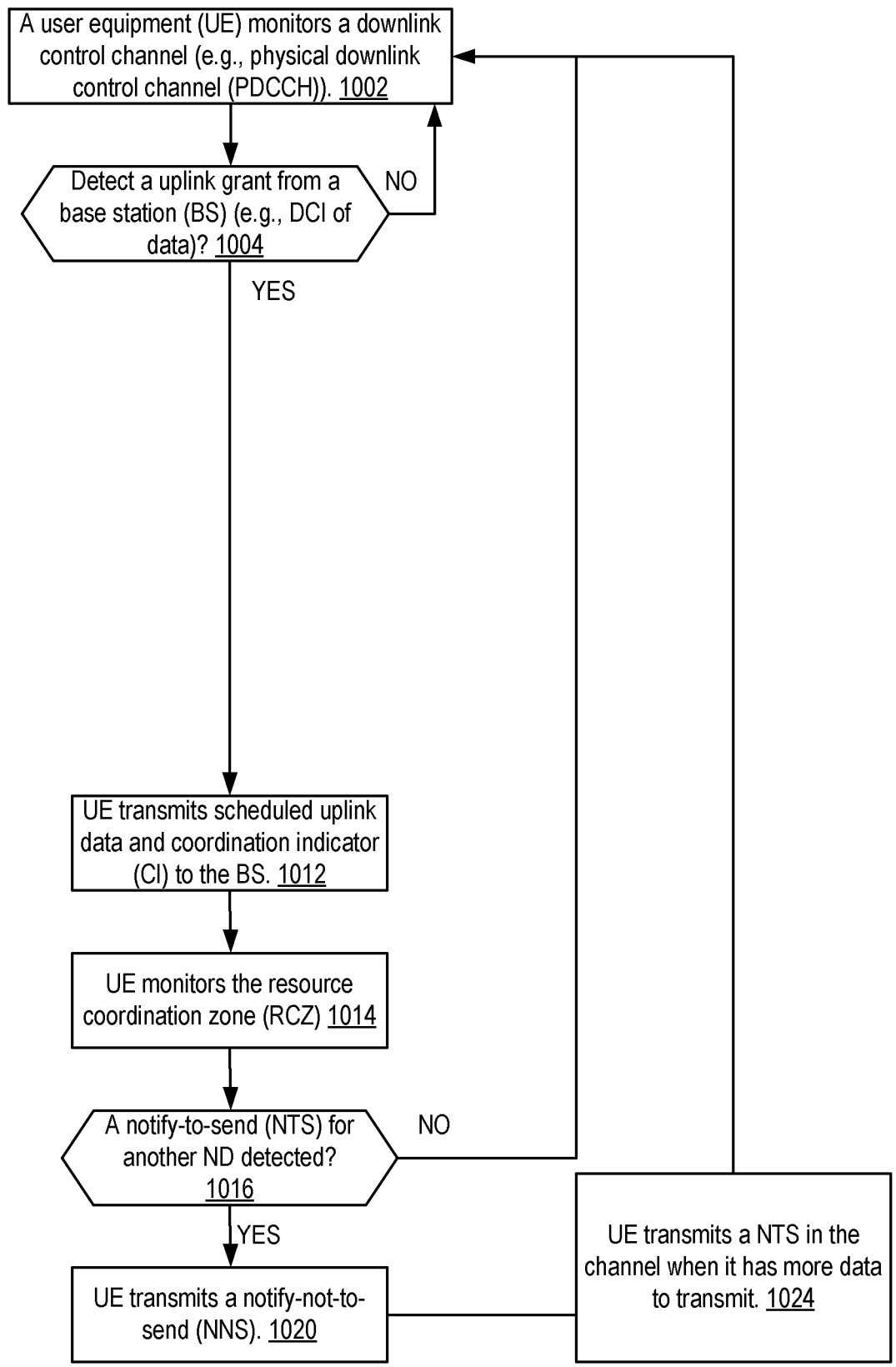
FIG. 10 illustrates operations of scheduled uplink transmission by a terminal device to resolve channel interference in a wireless network using a coordination indicator per another embodiment of the invention.

While two-staged uplink grant is flexible, some embodiments of the invention uses a single stage uplink grant. FIGS. 9-10 operations of base stations and terminal devices with such single stage uplink grant embodiments. FIG. 9 illustrates operations of scheduled uplink transmission by a base station to resolve channel interference in a wireless network using a coordination indicator per another embodiment of the invention. FIG. 9 is similar to FIG. 7, but the base station issues only a single stage uplink grant (at reference 919). FIG. 10 illustrates operations of scheduled uplink transmission by a terminal device to resolve channel interference in a wireless network using a coordination indicator per another embodiment of the invention. FIG. 10 is similar to FIG. 8, yet the terminal device monitors for only a single stage uplink grant (at reference 1004).

Figure 11:
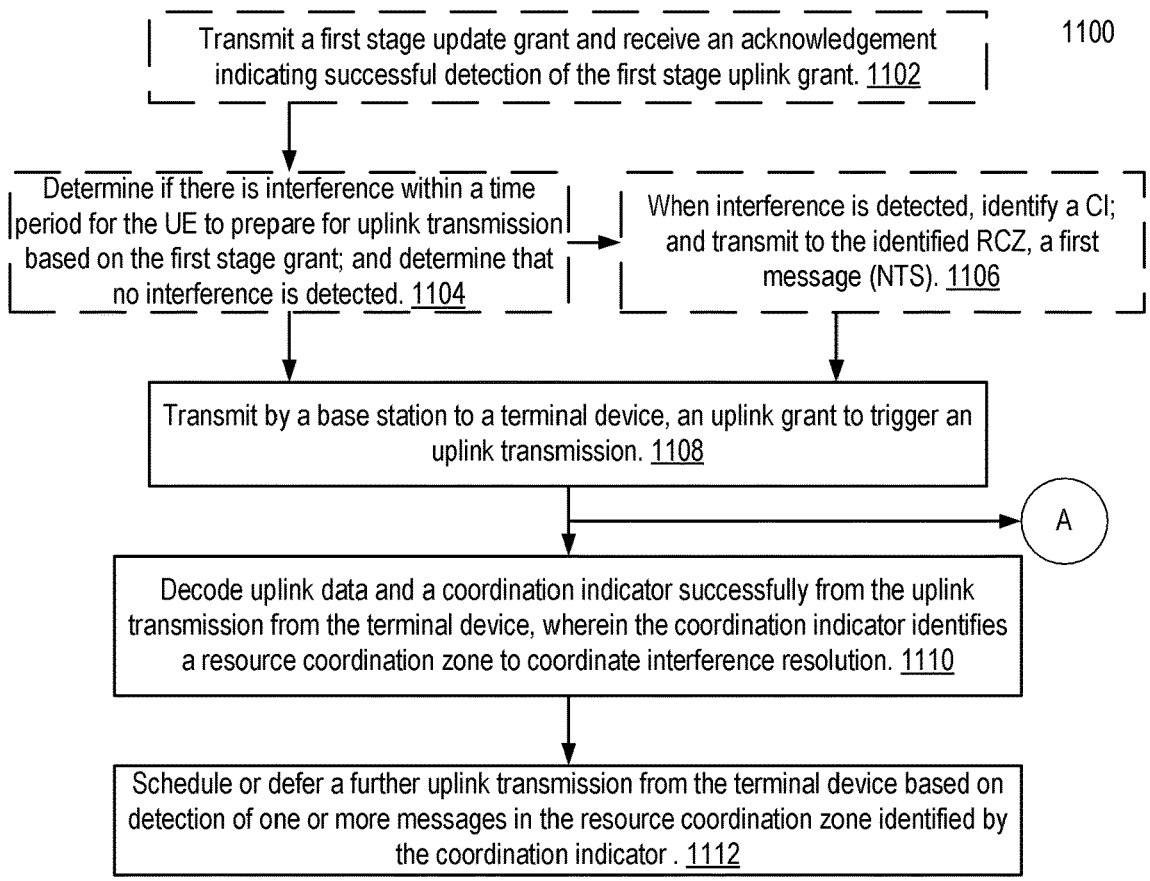
FIG. 11 is a flow diagram illustrating operations of scheduled uplink transmission by a base station to resolve channel interference in a wireless network using a coordination indicator per one embodiment of the invention.

FIG. 11 is a flow diagram illustrating operations of scheduled uplink transmission by a base station to resolve channel interference in a wireless network using a coordination indicator per one embodiment of the invention. The operations may be performed by an interference coordinator such as the interference coordinators 603 and 605 in the base stations 602 and 604. The wireless network includes base stations and terminal devices. In one embodiment, a base station is one of an evolved node B (eNodeB) and a next generation node B (gNB), and a terminal device that transmit uplink data is a user equipment.

Optionally at reference 1102, the base station transmits a first stage uplink grant and receives an acknowledgment indicating a successful detection of the first stage uplink grant. Optionally at reference 1104, after receiving the acknowledgment, the base station determines if there is interference within a time period for the UE to prepare for uplink transmission based on the first stage uplink grant. The base station then transmits the uplink grant to trigger an uplink transmission, when no interference is detected.

When interference is detected, the flow goes to reference 1106, where the base station identifies a coordination indicator from a channel in which the uplink transmission is performed within a time period. The base station then transmits to a resource coordination zone identified by the coordination indicator, a first message for notifying that the terminal device plans to transmit. The operations in references 714-718 and 914-918 are examples of reference 1106.

At reference 1108, the base station transmits an uplink grant to a terminal device to trigger an uplink transmission. At reference 1110, the base station decodes uplink data and a coordination indicator successfully from the uplink transmission from the terminal device, wherein the coordination indicator identifies a resource coordination zone to coordinate interference resolution. When an interference coordinator performs operations starting at reference 1102, the uplink grant transmitted at reference 1108 is also referred to as a second stage uplink grant.

At reference 1112, the base station schedules or defers a further uplink transmission from the terminal device based on detection of one or more messages in the resource coordination zone identified by the coordination indicator.

In one embodiment, the resource coordination zone includes a time period and a frequency range. In one embodiment, the coordination indicator further indicates resource elements for the interference resolution, and wherein a resource element uses a number of orthogonal frequency-division multiplexing (OFDM) subcarriers within an OFDM symbol.

Figure 12:
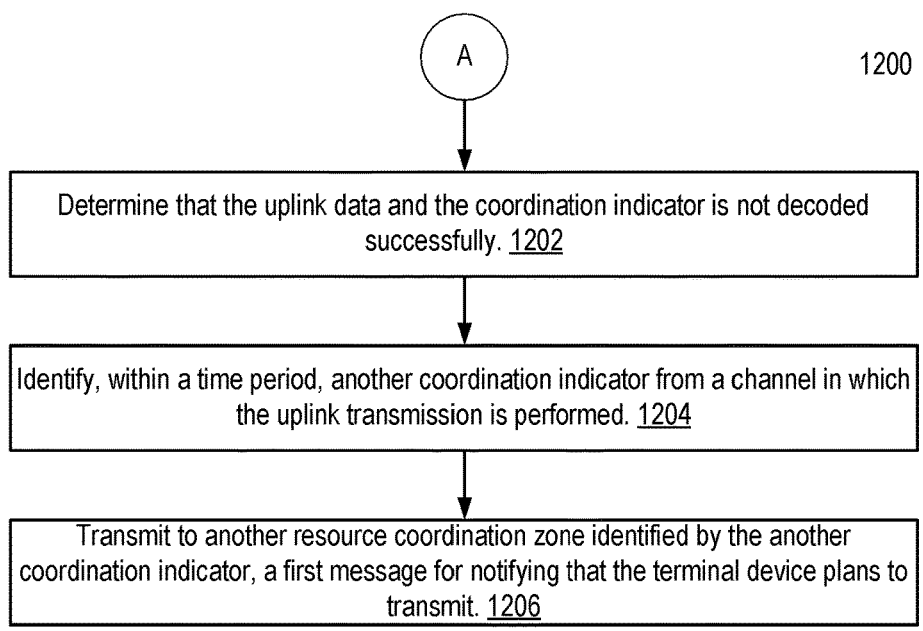
FIG. 12 is a flow diagram illustrating the operations when a base station fails to decode uplink data per one embodiment of the invention.

FIG. 12 is a flow diagram illustrating the operations when a base station fails to decode uplink data per one embodiment of the invention. The operations of method 1200 is a continuation of operations in method 1100 in one embodiment, and Circle A indicates from where the operations in method 1200 follow.

At reference 1202, the base station determines that the uplink data and the coordination indicator is not decoded successfully. At reference 1204, the base station identifies, within a time period, another coordination indicator from a channel in which the uplink transmission is performed. At reference 1206, the base station transmits in another resource coordination zone identified by the another coordination indicator, a first message for notifying that the terminal device plans to transmit. The operations relating to references 722 and 714-718, 922 and 914-918 are examples of operation in method 1200.

Figure 13:
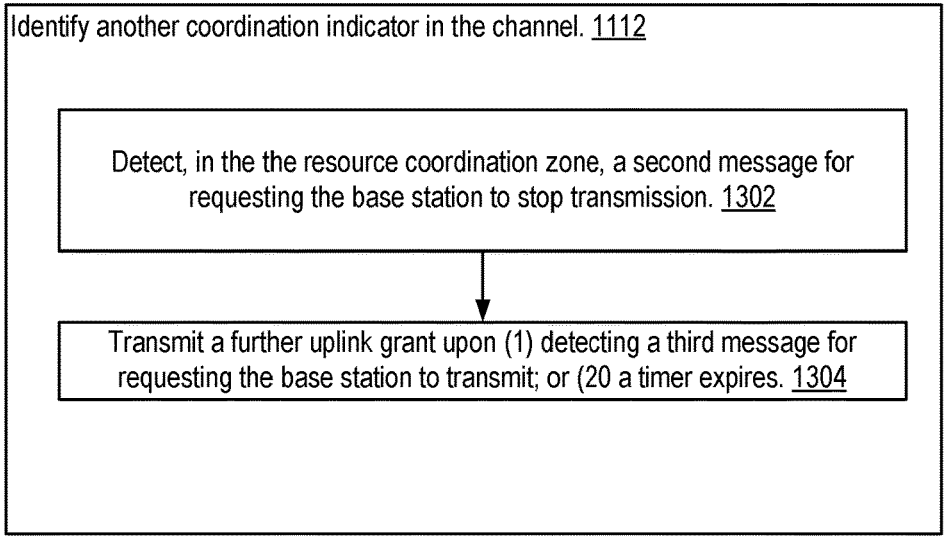
FIG. 13 is a flow diagram illustrating the operations of a base station scheduling or deferring a further uplink transmission per one embodiment of the invention.

FIG. 13 is a flow diagram illustrating the operations of a base station scheduling or deferring a further uplink transmission per one embodiment of the invention. In one embodiment, method 1300 is an embodiment of reference 1112. At reference 1302, the base station detects, in the resource coordination zone, a second message for requesting the base station to stop transmission. Operations in references 726 and 926 are examples of the detection.

At reference 1304, the base station transmits a further uplink grant upon (1) detecting a third message for requesting the base station to transmit; and (2) a timer expires. Operations in reference 728-730 and 928-930 are examples of the transmission.

Figure 14:
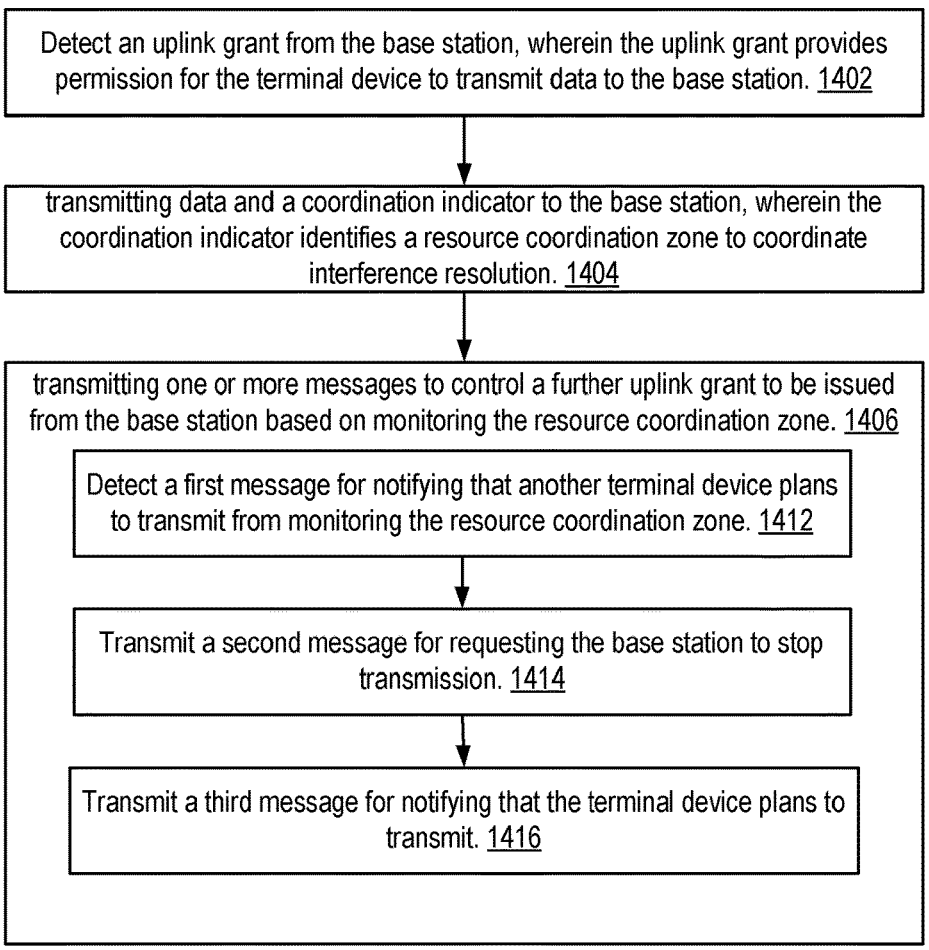
FIG. 14 is a flow diagram illustrating operations of scheduled uplink transmission by a terminal device to resolve channel interference in a wireless network using a coordination indicator per one embodiment of the invention.

FIG. 14 is a flow diagram illustrating operations of scheduled uplink transmission by a terminal device to resolve channel interference in a wireless network using a coordination indicator per one embodiment of the invention. The operations may be performed by an interference coordinator such as the interference coordinators 683 and 685 in the terminal devices 682 and 684. The wireless network includes base stations and terminal devices. In one embodiment, a base station is one of an evolved node B (eNodeB) and a next generation node B (gNB), and a terminal device that transmit uplink data is a user equipment.

At reference 1402, the terminal device detects an uplink grant from the base station, wherein the uplink grant provides permission for the terminal device to transmit data to the base station. At reference 1404, the terminal device transmits data and a coordination indicator to the base station, wherein the coordination indicator identifies a resource coordination zone to coordinate interference resolution. At reference 1406, the terminal device transmits one or more messages to control a further uplink grant to be issued from the base station based on monitoring the resource coordination zone.

In one embodiment, the operations within reference 1406 includes detecting a first message for notifying that another terminal device plans to transmit from monitoring the resource coordination zone. The NTS discussed relating to references 816 and 1016 is an example of the first message. The operations further include transmitting a second message for requesting the base station to stop transmission (the NNS discussed relating to reference 820 and 1020 is an example), and transmitting a third message for notifying that the terminal device plans to transmit (the NTS discussed relating to reference 824 and 1024 is an example). Through these messages, the terminal device controls whether or not the base station to issue further grants to the terminal device as illustrated in FIG. 6.

Exemplary Deployments

Figure 15:
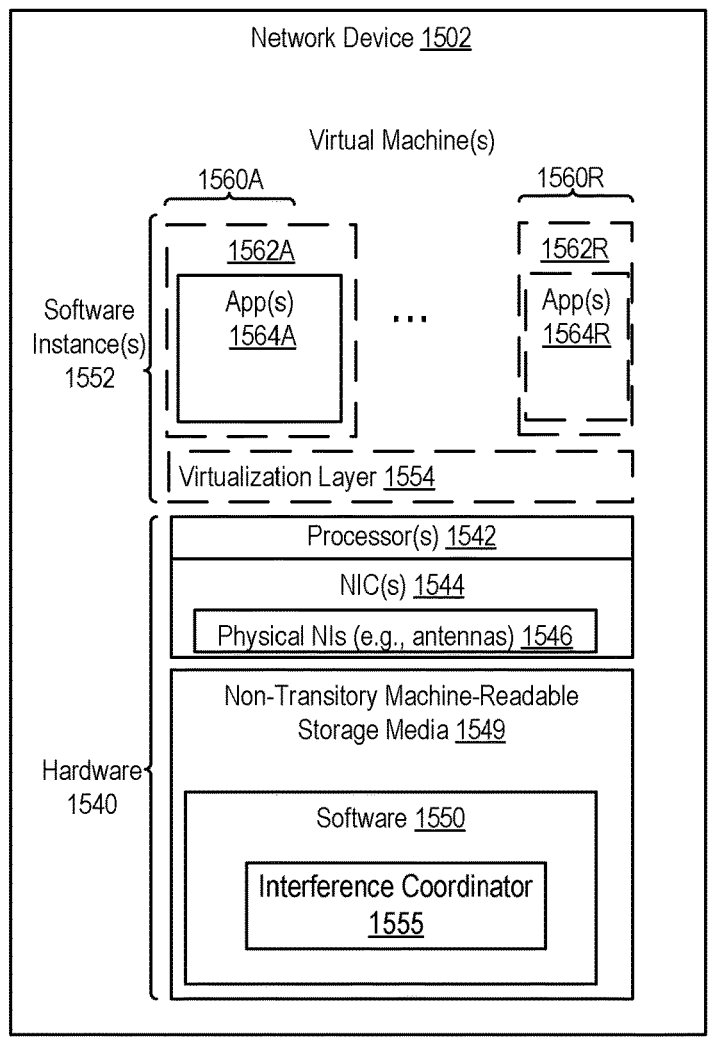
FIG. 15 illustrates a network device per one embodiment of the invention.

FIG. 15 illustrates a network device per one embodiment of the invention. The network device 1502 may be a base station such as base stations 602 and 604 or a terminal device such as the terminal devices 682 and 684. The network device 1502 may be implemented using custom application—specific integrated—circuits (ASICs) as processors and a special-purpose operating system (OS), or common off-the-shelf (COTS) processors and a standard OS.

The network device 1502 includes hardware 1540 comprising a set of one or more processors 1542 (which are typically COTS processors or processor cores or ASICs) and physical NIs 1546, as well as non-transitory machine-readable storage media 1549 having stored therein software 1550. During operation, the one or more processors 1542 may execute the software 1550 to instantiate one or more sets of one or more applications 1564A-R. While one embodiment does not implement virtualization, alternative embodiments may use different forms of virtualization. For example, in one such alternative embodiment the virtualization layer 1554 represents the kernel of an operating system (or a shim executing on a base operating system) that allows for the creation of multiple instances 1562A-R called software containers that may each be used to execute one (or more) of the sets of applications 1564A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment the virtualization layer 1554 represents a hypervisor (sometimes referred to as a virtual machine monitor (VMM)) or a hypervisor executing on top of a host operating system, and each of the sets of applications 1564A-R run on top of a guest operating system within an instance 1562A-R called a virtual machine (which may in some cases be considered a tightly isolated form of software container) that run on top of the hypervisor—the guest operating system and application may not know that they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1540, directly on a hypervisor (in which case the unikernel is sometimes described as running within a LibOS virtual machine), or in a software container, embodiments can be implemented fully with unikernels running directly on a hypervisor represented by virtualization layer 1554, unikernels running within software containers represented by instances 1562A-R, or as a combination of unikernels and the above-described techniques (e.g., unikernels and virtual machines both run directly on a hypervisor, unikernels and sets of applications that are run in different software containers).

The software 1550 contains an interference coordinator 1555. The interference coordinator 1555 may be one or more of the interference coordinators 603, 605, 683, and 685. The interference coordinator 1555 may perform operations in the one or more of exemplary methods 700-1300, described with reference to earlier figures. The instantiation of the one or more sets of one or more applications 1564A-R, as well as virtualization if implemented, are collectively referred to as software instance(s) 1552. Each set of applications 1564A-R, corresponding virtualization construct (e.g., instance 1562A-R) if implemented, and that part of the hardware 1540 that executes them (be it hardware dedicated to that execution and/or time slices of hardware temporally shared), forms a separate virtual network device 1560A-R.

A network interface (NI) may be physical or virtual. In the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). The physical network interface 1546 may include one or more antenna of the network device 1502. An antenna port may or may not correspond to a physical antenna.

Figure 16:
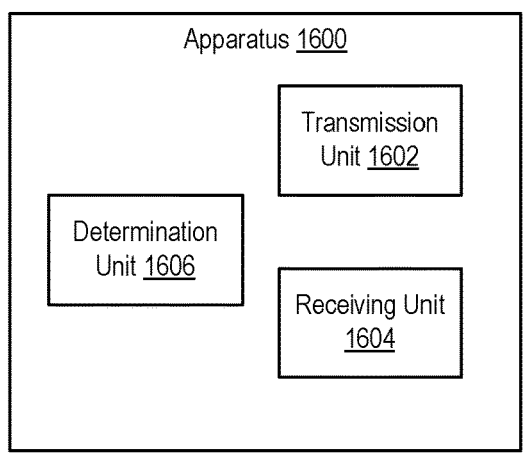
FIG. 16 illustrates a schematic block diagram of an apparatus 1600 in a wireless communication network for communicating between network devices per one embodiment of the invention.

FIG. 16 illustrates a schematic block diagram of an apparatus 1600 in a wireless communication network for communicating between network devices (e.g., network devices 602, 604, 682, and 684) per one embodiment of the invention. The apparatus may be implemented as/in a network device, e.g., one of the network devices 602, 604, 682, and 684. The apparatus 1600 is operable to carry out the exemplary method 700-1300 described with reference to earlier figures.

The apparatus 1600 includes a transmission unit 1602, a receiving unit 1604, and a determination unit 1606. In one embodiment, the transmission unit 1602 performs operations relating to transmitting data, uplink grants, and NTS/NNS messages when the apparatus 1600 includes a base station; the receiving unit 1604 perform operations relating to receiving data, and acknowledgment from a terminal device; and the determination unit 1606 determines uplink grant transmission, receiving the acknowledgments, and other operations detailed in the block diagrams and flow diagrams.

In one embodiment, the transmission unit 1602 performs operations relating to transmitting NTS/NNS messages and uplink data when the apparatus 1600 includes a terminal device; the receiving unit 1604 perform operations relating to receiving data and uplink grants from a base station; and the determination unit 1606 determines message transmission, data/grants receiving, and other operations detailed in the block diagrams and flow diagrams.

Some Embodiments of the Invention

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The following is a list of exemplary embodiments:

1. A method implemented in a base station for scheduling uplink transmission from a terminal device in a wireless network, the method comprising:

transmitting (1108), by the base station to the terminal device, an uplink grant to trigger an uplink transmission;

decoding (1110) uplink data and a coordination indicator successfully from the uplink transmission from the terminal device, wherein the coordination indicator identifies a resource coordination zone to coordinate interference resolution; and scheduling or deferring (1112) a further uplink transmission from the terminal device based on detection of one or more messages in the resource coordination zone identified by the coordination indicator.

2. The method of embodiment 1, wherein the resource coordination zone includes a time period and a frequency range.

3. The method of embodiment 1 or 2, wherein the coordination indicator further indicates resource elements for the interference resolution, and wherein a resource element uses a number of orthogonal frequency-division multiplexing (OFDM) subcarriers within an OFDM symbol.

4. The method of any of embodiments 1 to 3, further comprising:

determining (1202) that the uplink data and the coordination indicator is not decoded successfully;

identifying (1204), within a time period, another coordination indicator from a channel in which the uplink transmission is performed;

transmitting (1206), to another resource coordination zone identified by the another coordination indicator, a first message for notifying that the terminal device plans to transmit.

5. The method of any of embodiments 1 to 4, wherein the deferring transmission of the further uplink transmission comprises:

detecting (1302), in the resource coordination zone, a second message for requesting the base station to stop transmission;

transmitting (1304) a further uplink grant upon:
  detecting a third message for requesting the base station to transmit; or
  a timer expires.

6. The method of any of embodiments 1 to 5, wherein the uplink grant is a latter of a first and second stage uplink grant, wherein the first stage uplink grant specifies uplink transmission characteristics including rank indicator, pre-coding matrix indicator, modulation and coding scheme; and wherein the second stage uplink grant specifies a time for the terminal device to transmit.

7. The method of any of embodiment 1 to 6, further comprising:
prior to the transmission of the uplink grant, transmitting (1102) the first stage uplink grant; and
receiving (1102) an acknowledgment indicating a successful detection of the first stage uplink grant.

8. The method of any of embodiments 1 to 7, further comprising:
after receiving the acknowledgement, determining (1104) if there is interference within a time period for the UE to prepare for uplink transmission based on the first stage uplink grant; and wherein the uplink grant is transmitted when no interference is detected.

9. The method of any of embodiments 1 to 8, further comprising:
when interference is detected, identifying (1106), within a time period, another coordination indicator from a channel in which the uplink transmission is performed;
transmitting (1106), to another resource coordination zone identified by the another coordination indicator, a first message for notifying that the terminal device plans to transmit.

10. The method of any of embodiments 1 to 9, wherein the base station is one of an evolved node B (eNodeB) and a next generation node B (gNB), and wherein the terminal device is a user equipment.

11. A non-transitory machine-readable storage medium (1549) that provides instructions, which when executed by a processor of a network device, cause the processor to perform methods 1-10.

12. A network device to transmit data to another network device in a wireless network, the network device comprising:
a non-transitory machine-readable storage medium (1549) to store instructions; and
a processor (1542) coupled with the non-transitory machine-readable storage medium (1549) to process the stored instructions, causing the network device to perform operations comprising:
transmitting (1108), by the base station to the terminal device, an uplink grant to trigger an uplink transmission;
decoding (1110) uplink data and a coordination indicator successfully from the uplink transmission from the terminal device, wherein the coordination indicator identifies a resource coordination zone to coordinate interference resolution; and
scheduling or deferring (1112) a further uplink transmission from the terminal device based on detection of one or more messages in the resource coordination zone identified by the coordination indicator.

13. A method implemented in a terminal device for scheduling uplink transmission from the terminal device to a base station in a wireless network, the method comprising:
detecting (1402) an uplink grant from the base station, wherein the uplink grant provides permission for the terminal device to transmit data to the base station;
transmitting (1404) data and a coordination indicator to the base station, wherein the coordination indicator identifies a resource coordination zone to coordinate interference resolution; and
transmitting (1406) one or more messages to control a further uplink grant to be issued from the base station based on monitoring the resource coordination zone.

14. The method of embodiment 13, wherein the uplink grant is a latter of a first stage uplink grant and a second stage uplink grant, and wherein the terminal device prepares data transmission upon receiving the first stage uplink grant based on data transmission information indicated in the first stage uplink grant, and wherein the second stage uplink grant provides the timing of the data transmission, based on which the terminal device transmits the data and the coordination indicator.

15. The method of embodiment 13 or 14, wherein transmitting one or more messages to control the further uplink grant comprising:
detecting (1412) a first message for notifying that another terminal device plans to transmit from monitoring the resource coordination zone;
transmitting (1414) a second message for requesting the base station to stop transmission; and
transmitting (1416) a third message for notifying that the terminal device plans to transmit.

16. The method of any of embodiments 13 to 15, wherein the resource coordination zone includes a time period and a frequency range.

17. The method of any of embodiments 13 to 16, wherein the coordination indicator further indicates resource elements for the interference resolution, and wherein a resource element uses a number of orthogonal frequency-division multiplexing (OFDM) subcarriers within an OFDM symbol.

18. The method of any of embodiments 13 to 17, wherein the base station is one of an evolved node B (eNodeB) and a next generation node B (gNB), and wherein the terminal device is a user equipment.

19. A non-transitory machine-readable storage medium (1549) that provides instructions, which when executed by a processor of a network device, cause the processor to perform methods 1-10.

20. A network device to transmit data to another network device in a wireless network, the network device comprising:
a non-transitory machine-readable storage medium (1549) to store instructions; and
a processor (1542) coupled with the non-transitory machine-readable storage medium (1549) to process the stored instructions, causing the network device to perform operations comprising:
detecting (1402) an uplink grant from the base station, wherein the uplink grant provides permission for the terminal device to transmit data to the base station;
transmitting (1404) data and a coordination indicator to the base station, wherein the coordination indicator identifies a resource coordination zone to coordinate interference resolution; and
transmitting (1406) one or more messages to control a further uplink grant to be issued from the base station based on monitoring the resource coordination zone.

What is claimed is:

1. A method implemented at a base station for scheduling uplink transmission from a terminal device in a wireless network, the method comprising:
transmitting, to the terminal device, an uplink grant for an uplink transmission, the uplink grant being a latter of a first and second stage uplink grant, the first stage uplink grant specifying uplink transmission characteristics including rank indicator, pre-coding matrix indicator, modulation and coding scheme; and the second stage uplink grant specifying a time for the terminal device to transmit;

decoding uplink data and a coordination indicator successfully from the uplink transmission from the terminal device, wherein the coordination indicator identifies a resource coordination zone to coordinate interference resolution; and scheduling or deferring a further uplink transmission from the terminal device based on detection of one or more messages in the resource coordination zone identified by the coordination indicator.

2. The method of claim 1, wherein the coordination indicator further indicates resource elements for the interference resolution, and wherein a resource element uses a number of orthogonal frequency-division multiplexing (OFDM) subcarriers within an OFDM symbol.

3. The method of claim 1, further comprising:
determining that the uplink data and the coordination indicator is not decoded successfully;
identifying, within a time period, another coordination indicator from a channel in which the uplink transmission is performed; and
transmitting, in another resource coordination zone identified by the another coordination indicator, a first message for notifying the terminal device to transmit.

4. The method of claim 1, wherein the deferring transmission of the further uplink transmission comprises:
detecting, in the resource coordination zone, a second message for requesting the base station to stop transmission;
transmitting a further uplink grant upon:
detecting a third message for requesting the base station to transmit the further uplink grant; or
a timer expires.

5. The method of claim 1, further comprising:
prior to the transmission of the uplink grant, transmitting a first stage uplink grant; and
receiving an acknowledgment indicating a successful detection of the first stage uplink grant.

6. The method of claim 5, further comprising:
after receiving the acknowledgement, determining if there is interference within a time period for the terminal device to prepare for uplink transmission based on the first stage uplink grant; and wherein the uplink grant is transmitted when no interference is detected.

7. The method of claim 6, further comprising:
when interference is detected, identifying, within a time period, another coordination indicator from a channel in which the uplink transmission is performed; and
transmitting, in another resource coordination zone identified by the another coordination indicator, a first message for notifying the terminal device to transmit.

8. A network device to serve as a base station and capable of transmitting data to another network device to serve as a terminal device in a wireless network, the network device comprising:
a non-transitory machine-readable storage medium to store instructions; and
a processor coupled with the non-transitory machine-readable storage medium to process the stored instructions, capable of causing the network device to perform operations comprising:
transmitting, to the terminal device, an uplink grant to trigger an uplink transmission, the uplink grant being a latter of a first and second stage uplink grant, the first stage uplink grant specifying uplink transmission characteristics including rank indicator, precoding matrix indicator, modulation and coding scheme; and the second stage uplink grant specifying a time for the terminal device to transmit;

decoding uplink data and a coordination indicator successfully from the uplink transmission from the terminal device, wherein the coordination indicator identifies a resource coordination zone to coordinate interference resolution; and scheduling or deferring a further uplink transmission from the terminal device based on detection of one or more messages in the resource coordination zone identified by the coordination indicator.

9. The network device of claim 8, wherein the coordination indicator further indicates resource elements for the interference resolution, and wherein a resource element uses a number of orthogonal frequency-division multiplexing (OFDM) subcarriers within an OFDM symbol.

10. The network device of claim 8, wherein the network device is further caused to perform:
determining that the uplink data and the coordination indicator is not decoded successfully;
identifying, within a time period, another coordination indicator from a channel in which the uplink transmission is performed; and
transmitting, in another resource coordination zone identified by the another coordination indicator, a first message for notifying the terminal device to transmit.

11. The network device of claim 8, wherein the network device is further caused to perform:
detecting, in the resource coordination zone, a second message for requesting the network device to stop transmission;
transmitting a further uplink grant upon:
detecting a third message for requesting the base station to transmit the further uplink grant; or
a timer expires.

12. The network device of claim 8, wherein the network device is further caused to perform:
prior to the transmission of the uplink grant, transmitting the first stage uplink grant;
receiving an acknowledgment indicating a successful detection of the first stage uplink grant; and
determining if there is interference within a time period for the terminal device to prepare for uplink transmission based on the first stage uplink grant;
wherein the uplink grant is transmitted when no interference is detected.

13. The network device of claim 8, wherein the network device is further caused to perform:
when interference is detected, identifying, within a time period, another coordination indicator from a channel in which the uplink transmission is performed; and
transmitting, in another resource coordination zone identified by the another coordination indicator, a first message for notifying the terminal device to transmit.

14. A method implemented at a terminal device for scheduling uplink transmission in a wireless network, the method comprising:
detecting an uplink grant from a base station, the uplink grant providing permission for the terminal device to transmit data to the base station and being a latter of a first stage uplink grant and a second stage uplink grant, and the terminal device preparing data transmission upon receiving the first stage uplink grant based on data transmission information indicated in the first stage uplink grant, and the second stage uplink grant providing the timing of the data transmission, based on which the terminal device transmits the data and the coordination indicator;

transmitting data and a coordination indicator to the base station, the coordination indicator identifying a resource coordination zone to coordinate interference resolution; and transmitting one or more messages to control a further uplink grant to be issued from the base station based on monitoring the resource coordination zone.

15. The method of claim 14, wherein transmitting the one or more messages to control the further uplink grant comprises:

detecting a first message for notifying that another terminal device plans to transmit from monitoring the resource coordination zone;

transmitting a second message for requesting the base station to stop transmission; and transmitting a third message for notifying that the terminal device plans to transmit.

16. A network device to serve as a terminal device and capable of transmitting data to another network device to serve as a base station in a wireless network, the network device comprising:

a non-transitory machine-readable storage medium to store instructions; and a processor coupled with the non-transitory machine-readable storage medium to process the stored instructions, causing the network device to perform operations comprising:

detecting an uplink grant from the base station, the uplink grant providing permission for the network device to transmit data to the base station and being a latter of a first stage uplink grant and a second stage uplink grant, and the terminal device preparing data transmission upon receiving the first stage uplink grant based on data transmission information indicated in the first stage uplink grant, and the second stage uplink grant providing the timing of the data transmission, based on which the terminal device transmits the data and the coordination indicator;

transmitting data and a coordination indicator to the base station, the coordination indicator identifying a resource coordination zone to coordinate interference resolution; and transmitting one or more messages to control a further uplink grant to be issued from the base station based on monitoring the resource coordination zone.

17. The network device of claim 16, wherein transmitting the one or more messages to control the further uplink grant comprises:

detecting a first message for notifying that another terminal device plans to transmit from monitoring the resource coordination zone;

transmitting a second message for requesting the base station to stop transmission; and transmitting a third message for notifying that the network device plans to transmit.

\* \* \* \* \*